US011351821B1

(12) United States Patent
Jaskot et al.

(10) Patent No.: US 11,351,821 B1
(45) Date of Patent: Jun. 7, 2022

(54) TRAILER CONFIGURED FOR MULTIPLE HITCHES

(71) Applicant: International Automated Systems, Inc., Blaine, MN (US)

(72) Inventors: Jason Jaskot, Baldwin, WI (US); William D. Britz, Winchester, VA (US)

(73) Assignee: International Automated System, Inc., Blaine, MN (US)

( * ) Notice: Subject to any disclaimer, the term of this patent is extended or adjusted under 35 U.S.C. 154(b) by 961 days.

(21) Appl. No.: 16/107,314

(22) Filed: Aug. 21, 2018

Related U.S. Application Data

(60) Provisional application No. 62/648,860, filed on Mar. 27, 2018.

(51) Int. Cl.
*B60D 1/07* (2006.01)
*B62D 63/08* (2006.01)

(52) U.S. Cl.
CPC ............. *B60D 1/075* (2013.01); *B62D 63/08* (2013.01)

(58) Field of Classification Search
CPC .... B60D 1/075; B62D 63/08; B62D 53/0828; B62D 21/20; B60P 1/431
See application file for complete search history.

(56) References Cited

U.S. PATENT DOCUMENTS

| | | | | |
|---|---|---|---|---|
| 2,370,427 A | * | 2/1945 | Sherry | B60P 1/431 414/537 |
| 3,511,393 A | * | 5/1970 | Abromavage | B60P 1/431 414/537 |
| 3,698,740 A | * | 10/1972 | Chisholm | B62D 53/06 280/491.4 |
| 3,700,124 A | * | 10/1972 | Lawrence | B60P 3/07 414/537 |
| 3,796,443 A | * | 3/1974 | Crutchfield | B60D 1/488 280/406.2 |
| 3,810,661 A | * | 5/1974 | Lowrance | B60D 1/06 280/417.1 |
| 3,815,936 A | * | 6/1974 | Oaks, Jr. | B62D 53/061 280/417.1 |
| 3,840,252 A | * | 10/1974 | Jocoy | B62D 53/0828 280/417.1 |
| 3,870,170 A | * | 3/1975 | Noble | B60P 1/431 414/537 |
| 3,876,674 A | * | 4/1975 | Jenkins | B60D 1/14 280/417.1 |

(Continued)

*Primary Examiner* — Minnah L Seoh
*Assistant Examiner* — Conan D Duda
(74) *Attorney, Agent, or Firm* — Suiter Swantz pc llo

(57) ABSTRACT

A trailer includes a trailer bed, a draw bar assembly, and a convertible hitch assembly. The trailer bed includes a platform and one or more sets of two or more wheels. The draw bar assembly is coupled to the trailer bed. The convertible hitch assembly includes a hitch converter coupled to the draw bar assembly. The convertible hitch assembly includes an over-axle hitch coupler insertable into the hitch converter, wherein the over-axle hitch coupler is mated to an over-axle hitch component coupled to a first vehicle. The convertible hitch assembly includes a behind-axle hitch coupler insertable into the hitch converter, wherein the behind-axle hitch coupler is mated to a behind-axle hitch component coupled to at least one of the first vehicle or an additional vehicle.

18 Claims, 26 Drawing Sheets

(56) References Cited

U.S. PATENT DOCUMENTS

| | | | | |
|---|---|---|---|---|
| 3,889,978 A * | | 6/1975 | Kann | B60D 1/065 280/417.1 |
| 3,918,744 A * | | 11/1975 | Gay | B62D 53/0857 280/418.1 |
| 3,955,831 A * | | 5/1976 | Whitchurch | B60D 1/065 280/423.1 |
| 4,032,167 A * | | 6/1977 | Chereda | B60P 3/07 410/3 |
| 4,198,187 A * | | 4/1980 | Mountz | B60P 1/431 14/71.1 |
| 4,219,211 A * | | 8/1980 | Sauers | B60P 3/062 280/441.2 |
| 4,242,032 A * | | 12/1980 | Whiteman | B60P 1/431 14/71.1 |
| 4,261,594 A * | | 4/1981 | Corbett | B60D 1/07 280/417.1 |
| 4,433,853 A * | | 2/1984 | Swaim | B60D 1/07 280/417.1 |
| 4,468,046 A * | | 8/1984 | Rutherford | B62C 1/06 280/137.501 |
| 4,601,632 A * | | 7/1986 | Agee | B60P 1/431 14/71.1 |
| 4,657,233 A * | | 4/1987 | Vroom | B60P 1/438 16/306 |
| 4,685,857 A * | | 8/1987 | Goeser | B60P 1/431 296/26.1 |
| 4,722,109 A * | | 2/1988 | Mountz | B60P 1/431 14/71.1 |
| 4,832,358 A * | | 5/1989 | Bull | B62D 53/061 280/418.1 |
| 4,845,808 A * | | 7/1989 | Millar | B60P 1/431 16/422 |
| 4,850,788 A * | | 7/1989 | Dickson | B60P 1/431 414/537 |
| 4,900,217 A * | | 2/1990 | Nelson | B60P 1/431 14/71.1 |
| 4,929,018 A * | | 5/1990 | Carty | B60P 1/431 280/783 |
| 4,941,703 A * | | 7/1990 | Curry | B60P 1/431 292/100 |
| 5,022,697 A * | | 6/1991 | Hettwer | B60P 1/43 280/783 |
| 5,133,634 A * | | 7/1992 | Gingrich | B60P 1/431 14/71.1 |
| 5,145,310 A * | | 9/1992 | Calzone | B60P 1/43 14/71.3 |
| 5,199,150 A * | | 4/1993 | Mortenson | B60P 1/431 14/71.1 |
| 5,253,410 A * | | 10/1993 | Mortenson | B60P 1/431 14/71.1 |
| 5,306,113 A * | | 4/1994 | Mann | B60P 1/433 414/480 |
| 5,324,061 A * | | 6/1994 | Lay | B62D 53/0828 280/417.1 |
| 5,340,267 A * | | 8/1994 | Stoll | B60P 1/431 14/71.1 |
| 5,467,855 A * | | 11/1995 | Sorensen | B60P 1/431 193/5 |
| 5,566,964 A * | | 10/1996 | Leonard | B60D 1/07 280/416.1 |
| 5,797,614 A * | | 8/1998 | Hord | B62D 63/08 280/417.1 |
| 5,897,285 A * | | 4/1999 | Wanderscheid | B60P 1/431 414/537 |
| 6,109,640 A * | | 8/2000 | Allen | B60D 1/06 280/417.1 |
| 6,176,674 B1 * | | 1/2001 | Meeks | B60P 3/07 414/462 |
| 6,203,046 B1 * | | 3/2001 | Meurer | B62D 53/061 280/417.1 |
| 6,431,815 B1 * | | 8/2002 | Zarzecki | B60P 1/431 14/69.5 |
| 6,474,673 B1 * | | 11/2002 | Biggins | B60D 1/07 280/417.1 |
| 6,537,014 B1 * | | 3/2003 | Ridgdill | B60P 3/06 280/425.1 |
| 6,802,095 B1 * | | 10/2004 | Whitmarsh | B60P 1/431 14/69.5 |
| 6,860,701 B2 * | | 3/2005 | Kiser | A61G 3/061 414/522 |
| 7,052,227 B2 * | | 5/2006 | Navarro | B60P 1/431 414/537 |
| 7,077,616 B2 * | | 7/2006 | Wagner | B60P 1/431 414/537 |
| 7,121,574 B2 * | | 10/2006 | Bouwkamp | B62D 53/061 280/441.2 |
| 7,309,202 B1 * | | 12/2007 | Anderson | B60P 1/431 108/44 |
| 7,533,923 B1 * | | 5/2009 | Caldwell | B60P 1/431 296/61 |
| 7,819,619 B2 * | | 10/2010 | Cassway | B65D 88/129 414/558 |
| 7,878,524 B1 * | | 2/2011 | Hemmingsen | B62D 53/062 280/415.1 |
| 7,966,685 B2 * | | 6/2011 | Van Beek | B60P 1/431 14/71.1 |
| 7,976,264 B1 * | | 7/2011 | Pope | B60P 1/431 414/480 |
| 8,151,426 B2 * | | 4/2012 | Schneider | B62D 63/061 29/401.1 |
| 8,353,521 B1 * | | 1/2013 | Seeley | B62D 53/061 280/417.1 |
| 9,096,105 B1 * | | 8/2015 | Spiller | B60D 1/075 |
| 10,308,087 B1 * | | 6/2019 | Frosch | B60D 1/07 |
| 10,377,291 B2 * | | 8/2019 | Keck | A01K 1/035 |
| 10,639,972 B1 * | | 5/2020 | Lillo | B60G 17/0523 |
| 2005/0220595 A1 * | | 10/2005 | Hull | B60P 1/433 414/537 |
| 2006/0027997 A1 * | | 2/2006 | Grace | B60D 1/247 280/417.1 |
| 2007/0237614 A1 * | | 10/2007 | Johnson | B60P 1/431 414/467 |
| 2010/0038883 A1 * | | 2/2010 | Thedford | B60P 3/122 280/490.1 |
| 2010/0115714 A1 * | | 5/2010 | Cassway | B65D 88/129 14/71.3 |
| 2010/0242189 A1 * | | 9/2010 | Goin | B65G 69/28 14/71.1 |
| 2011/0073026 A1 * | | 3/2011 | Martin | A01B 63/16 111/130 |
| 2013/0223963 A1 * | | 8/2013 | Kramlick | B60P 3/07 414/537 |
| 2014/0165322 A1 * | | 6/2014 | Cramer | B60S 1/64 15/313 |
| 2016/0031502 A1 * | | 2/2016 | Hall | B60P 1/6445 280/415.1 |
| 2016/0059763 A1 * | | 3/2016 | Sindoni, Jr. | B60P 1/431 414/537 |
| 2018/0029656 A1 * | | 2/2018 | Barnes | B60R 9/02 |
| 2018/0056840 A1 * | | 3/2018 | Quenzi | B60P 1/162 |
| 2018/0079347 A1 * | | 3/2018 | Ellis | B60P 1/6454 |
| 2018/0118477 A1 * | | 5/2018 | Deshpande | B65G 69/30 |
| 2019/0016271 A1 * | | 1/2019 | Garceau | B60R 9/06 |
| 2019/0126839 A1 * | | 5/2019 | Grizzle | B60R 9/06 |
| 2019/0299234 A1 * | | 10/2019 | Schuetz | B60P 3/14 |
| 2020/0114990 A1 * | | 4/2020 | Blaschke | B60D 1/075 |
| 2021/0114422 A1 * | | 4/2021 | Goodarzi | B62D 53/08 |

\* cited by examiner

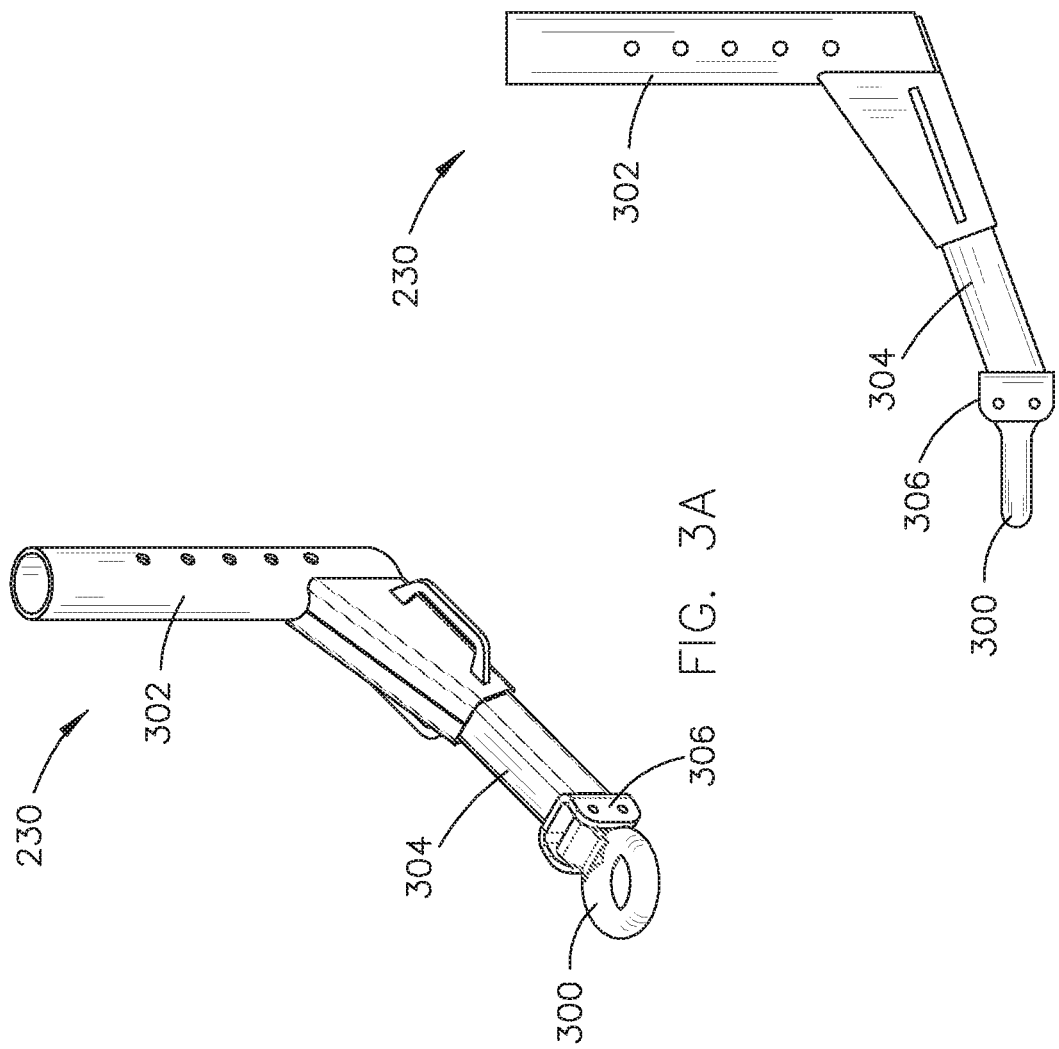
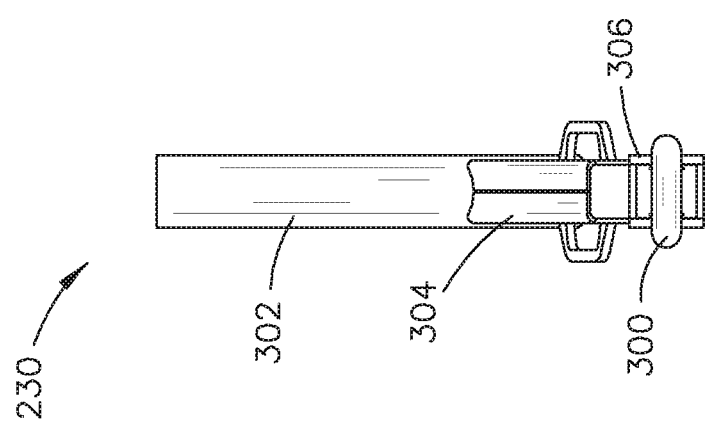

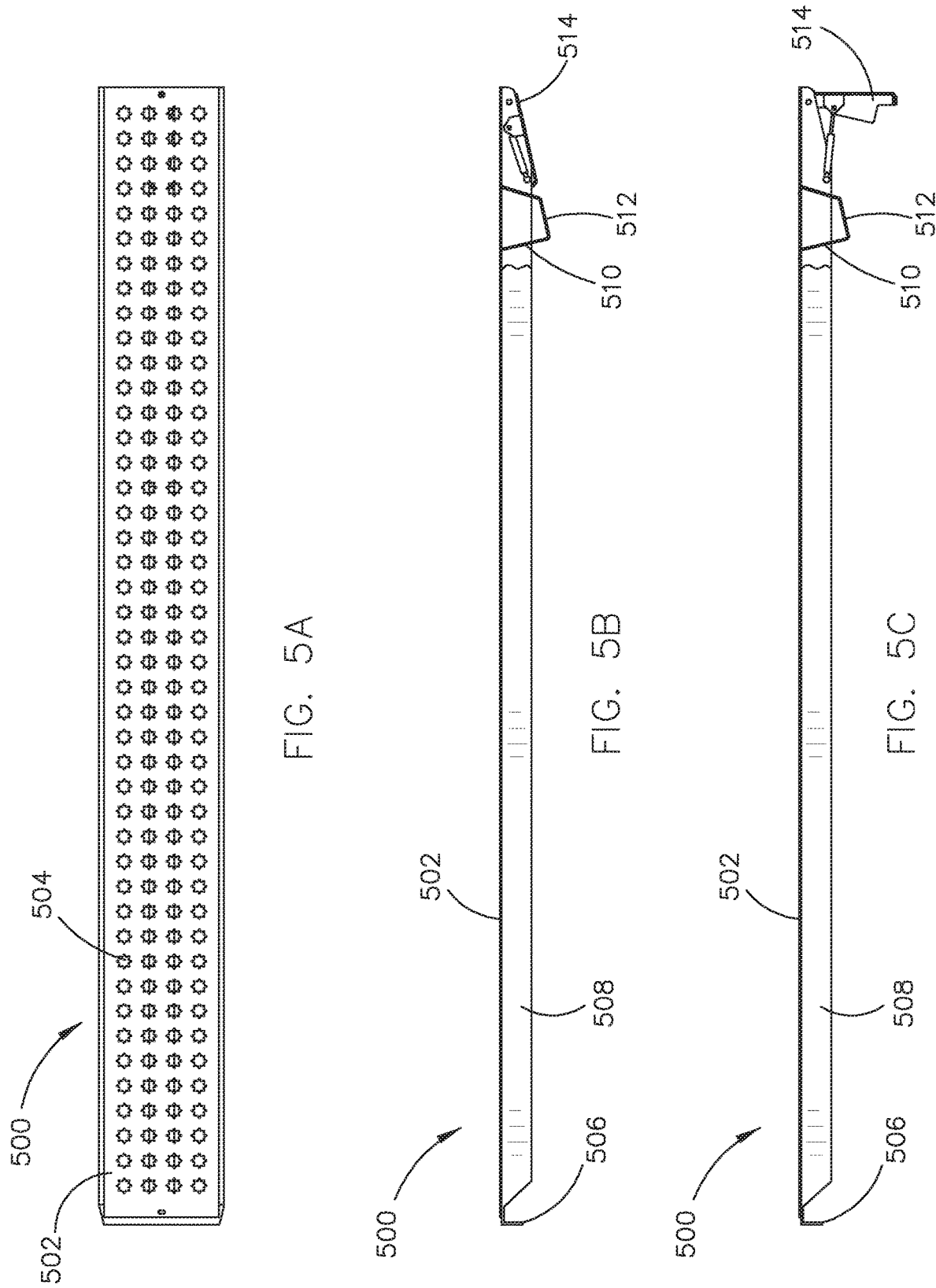

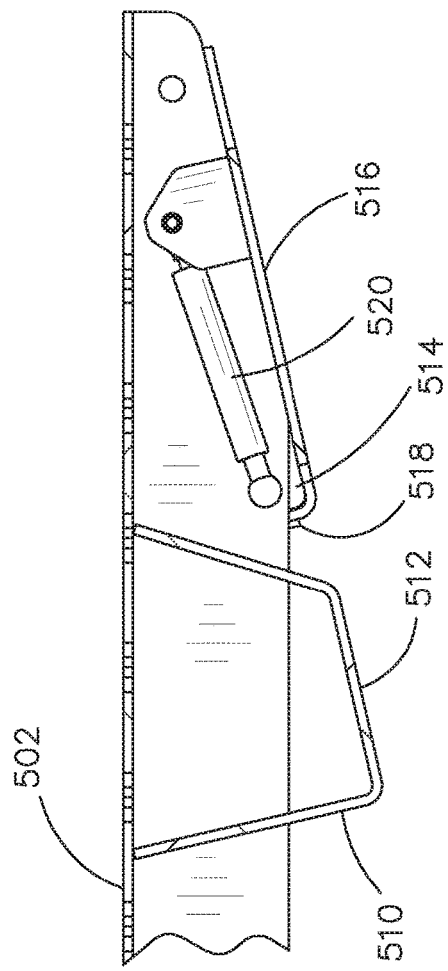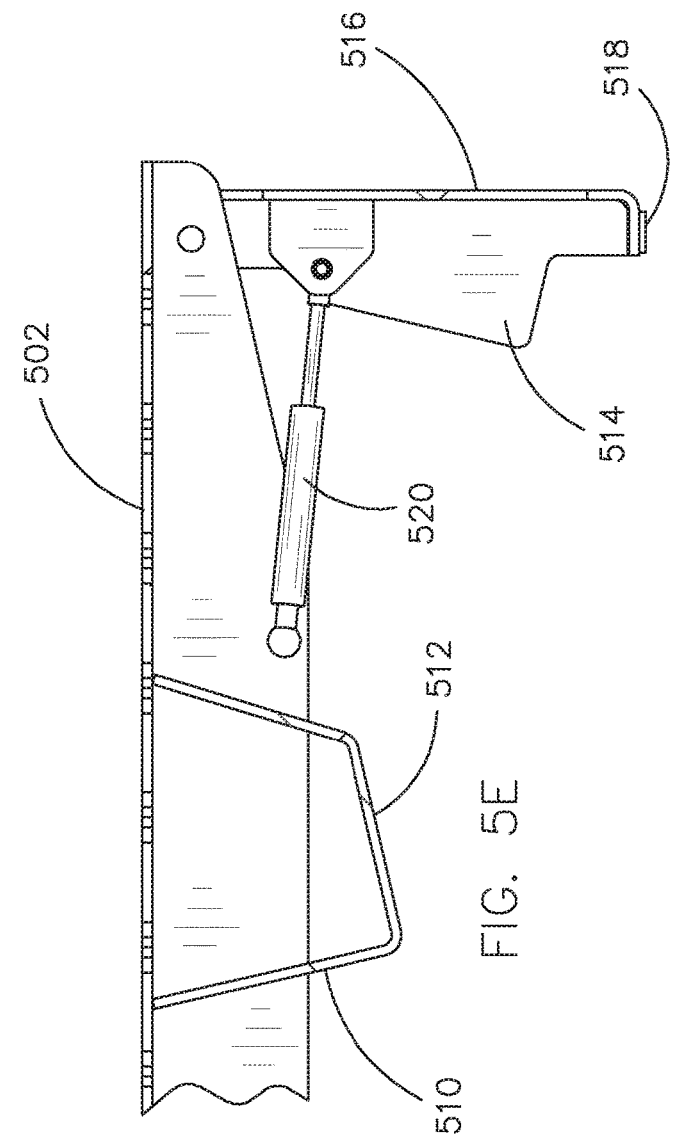

TRAILER CONFIGURED FOR MULTIPLE HITCHES

CROSS-REFERENCE TO RELATED APPLICATIONS

The present application claims the benefit under 35 U.S.C. § 119(e) of U.S. Provisional Patent Application Ser. No. 62/648,860, filed Mar. 27, 2018, titled TRAILER CONFIGURED TO COUPLE TO MULTIPLE TOWING SYSTEMS, naming Jason Jaskot as inventor, which is incorporated herein by reference in the entirety.

TECHNICAL FIELD

The present invention generally relates to trailers, and more particularly, to a trailer configured for multiple hitches.

BACKGROUND

Different types of trailer hitches are utilized when coupling a trailer to a vehicle. For example, the trailer may be coupled to the vehicle via a hitch positioned over (or just in front of) a rear axle such as a gooseneck, a fifth wheel hitch, or the like. By way of another example, the trailer may be coupled to the vehicle via a hitch positioned behind the rear axle such as a pintle hitch, a rear receiver hitch, a bumper hitch, a weight distribution hitch, or the like. Trailers are generally dependent and/or include a single type of hitch, such that multiple trailers may be necessary when trying to complete a particular task that requires multiple vehicles. The logistics of having to route multiple vehicles and trailers may be undesirable, especially where the task slated for completion is some distance away from a base of operation (e.g., in the field).

Therefore, it would be advantageous to provide a system and method that cures the shortcomings described above.

SUMMARY

A trailer is described, in accordance with one or more embodiments of the present disclosure. In one embodiment, the trailer includes a trailer bed. In another embodiment, the trailer bed includes a platform coupled to a trailer frame. In another embodiment, the trailer bed includes a set of runners coupled to the platform. In another embodiment, the set of runners are configured to receive one or more wheels of a first vehicle. In another embodiment, the trailer bed includes a set of wheel blocks configured to prevent the first vehicle from dismounting from the trailer bed. In another embodiment, the trailer bed includes one or more sets of two or more wheels. In another embodiment, the trailer includes a draw bar assembly coupled to the trailer bed. In another embodiment, the draw bar assembly includes one or more draw bar arms. In another embodiment, the trailer includes a convertible hitch assembly. In another embodiment, the convertible hitch assembly includes a hitch converter coupled to the one or more draw bar arms. In another embodiment, the convertible hitch assembly includes an over-axle hitch coupler insertable into the hitch converter. In another embodiment, the over-axle hitch coupler is couplable to the first vehicle when unloaded from the trailer bed. In another embodiment, the convertible hitch assembly includes a behind-axle hitch coupler insertable into the hitch converter. In another embodiment, the behind-axle hitch coupler is couplable to an additional vehicle.

A method is described, in accordance with one or more embodiments of the present disclosure. In one embodiment, the method may include, but is not limited to, transporting a first vehicle on a trailer coupled to an additional vehicle. In another embodiment, the trailer is convertible from a behind-axle hitch to an over-axle hitch. In another embodiment, the method may include, but is not limited to, unloading the first vehicle from the trailer. In another embodiment, the method may include, but is not limited to, uncoupling the additional vehicle from a behind-axle hitch coupler inserted in a hitch converter of the trailer. In another embodiment, the method may include, but is not limited to, removing the behind-axle hitch coupler from the hitch converter. In another embodiment, the method may include, but is not limited to, inserting an over-axle hitch coupler into the hitch converter. In another embodiment, the method may include, but is not limited to, coupling the first vehicle to the trailer via the over-axle hitch coupler.

A trailer is described, in accordance with one or more embodiments of the present disclosure. In one embodiment, the trailer includes a trailer bed including a platform and one or more sets of two or more wheels. In another embodiment, the trailer includes a draw bar assembly coupled to the trailer bed. In another embodiment, the trailer includes a convertible hitch assembly. In another embodiment, the convertible hitch assembly includes a hitch converter coupled to the draw bar assembly. In another embodiment, the convertible hitch assembly includes an over-axle hitch coupler insertable into the hitch converter. In another embodiment, the over-axle hitch coupler is mated to an over-axle hitch component coupled to a first vehicle. In another embodiment, the convertible hitch assembly includes a behind-axle hitch coupler insertable into the hitch converter. In another embodiment, the behind-axle hitch coupler is mated to a behind-axle hitch component coupled to at least one of the first vehicle or an additional vehicle.

BRIEF DESCRIPTION OF THE DRAWINGS

The numerous advantages of the present disclosure may be better understood by those skilled in the art by reference to the accompanying figures in which:

FIG. 3A illustrates a perspective view of a towing coupler for a trailer configured for multiple hitches, in accordance with one or more embodiments of the present disclosure;

FIG. 3B illustrates a front view of a towing coupler for a trailer configured for multiple hitches, in accordance with one or more embodiments of the present disclosure;

FIG. 3C illustrates a right view of a towing coupler for a trailer configured for multiple hitches, in accordance with one or more embodiments of the present disclosure;

FIG. 5A illustrates a top view of a ramp for a trailer configured for multiple hitches, in accordance with one or more embodiments of the present disclosure;

FIG. 5B illustrates a side view of a ramp for a trailer configured for multiple hitches, in accordance with one or more embodiments of the present disclosure;

FIG. 5C illustrates a side view of a ramp for a trailer configured for multiple hitches, in accordance with one or more embodiments of the present disclosure;

FIG. 5D illustrates a partial side view of a ramp for a trailer configured for multiple hitches, in accordance with one or more embodiments of the present disclosure;

FIG. 5E illustrates a partial side view of a ramp for a trailer configured for multiple hitches, in accordance with one or more embodiments of the present disclosure;

DETAILED DESCRIPTION OF THE INVENTION

Figure 1A:
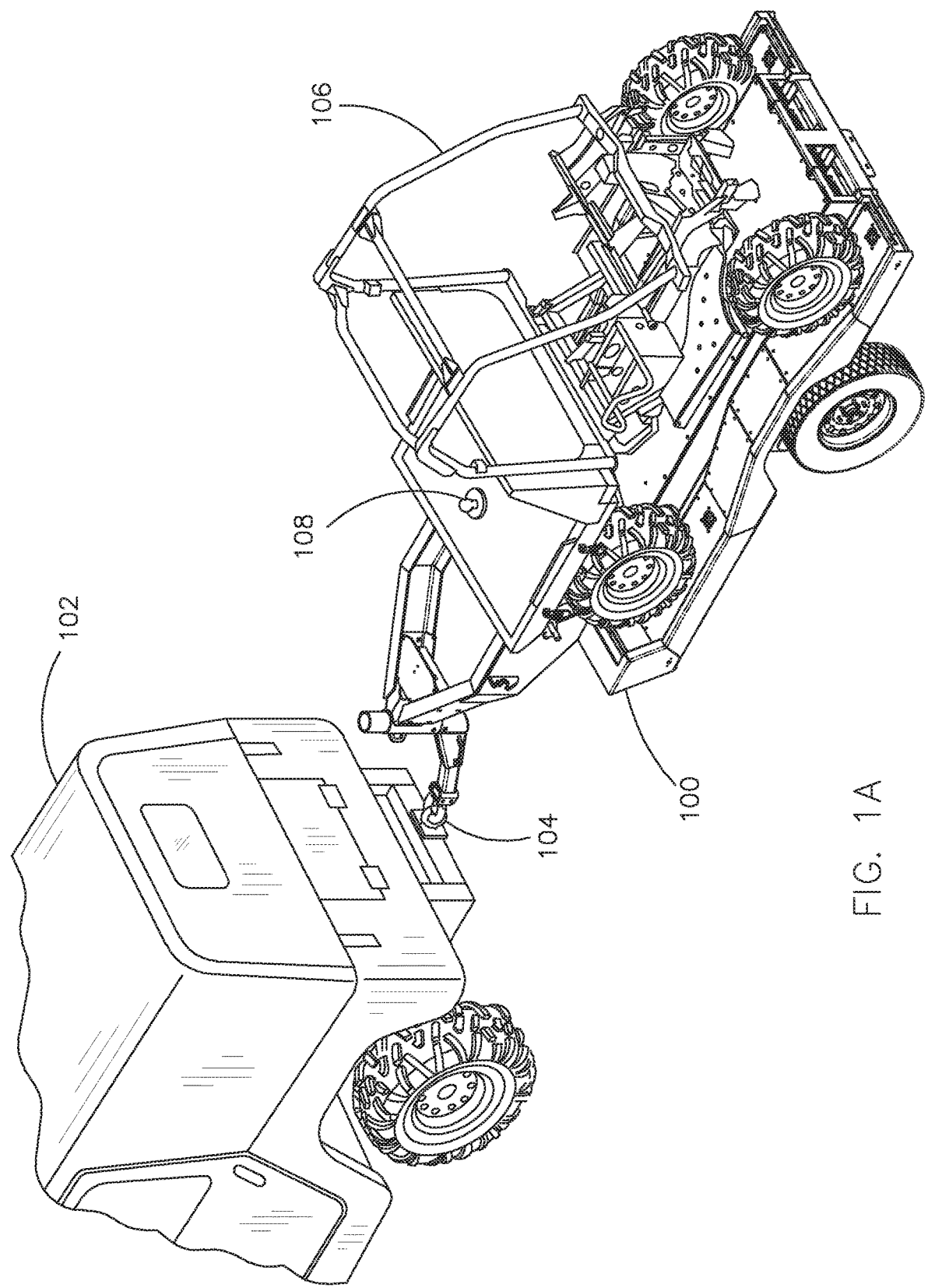
FIG. 1A illustrates a trailer configured for multiple hitches coupled to a vehicle, in accordance with one or more embodiments of the present disclosure.
Figure 1B:
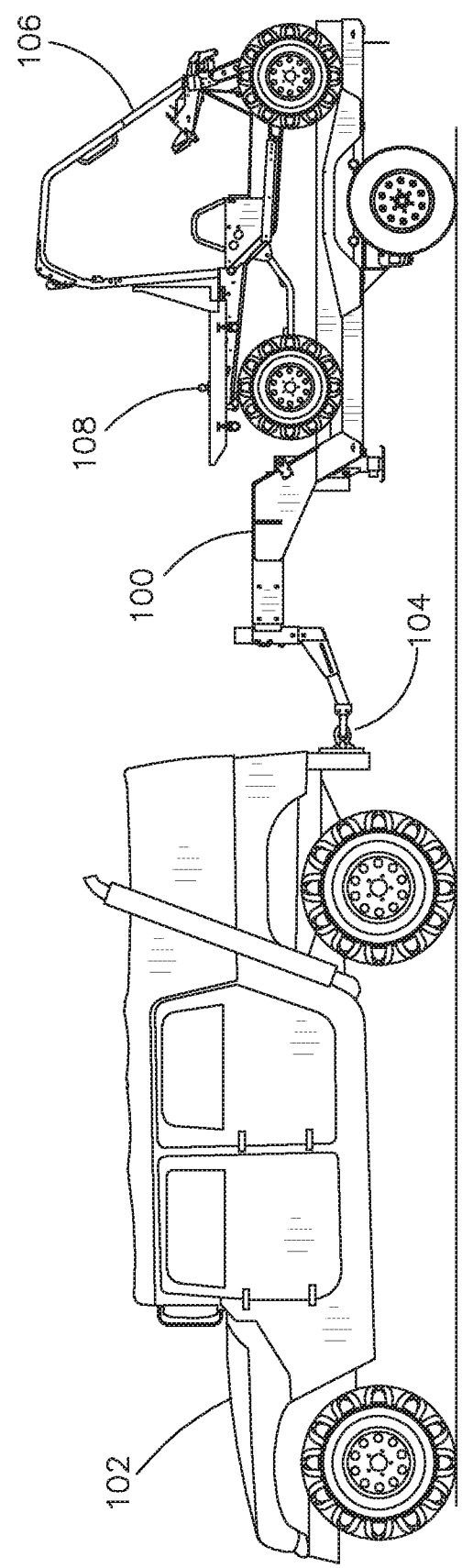
FIG. 1B illustrates a trailer configured for multiple hitches coupled to a vehicle, in accordance with one or more embodiments of the present disclosure.
Figure 1C:
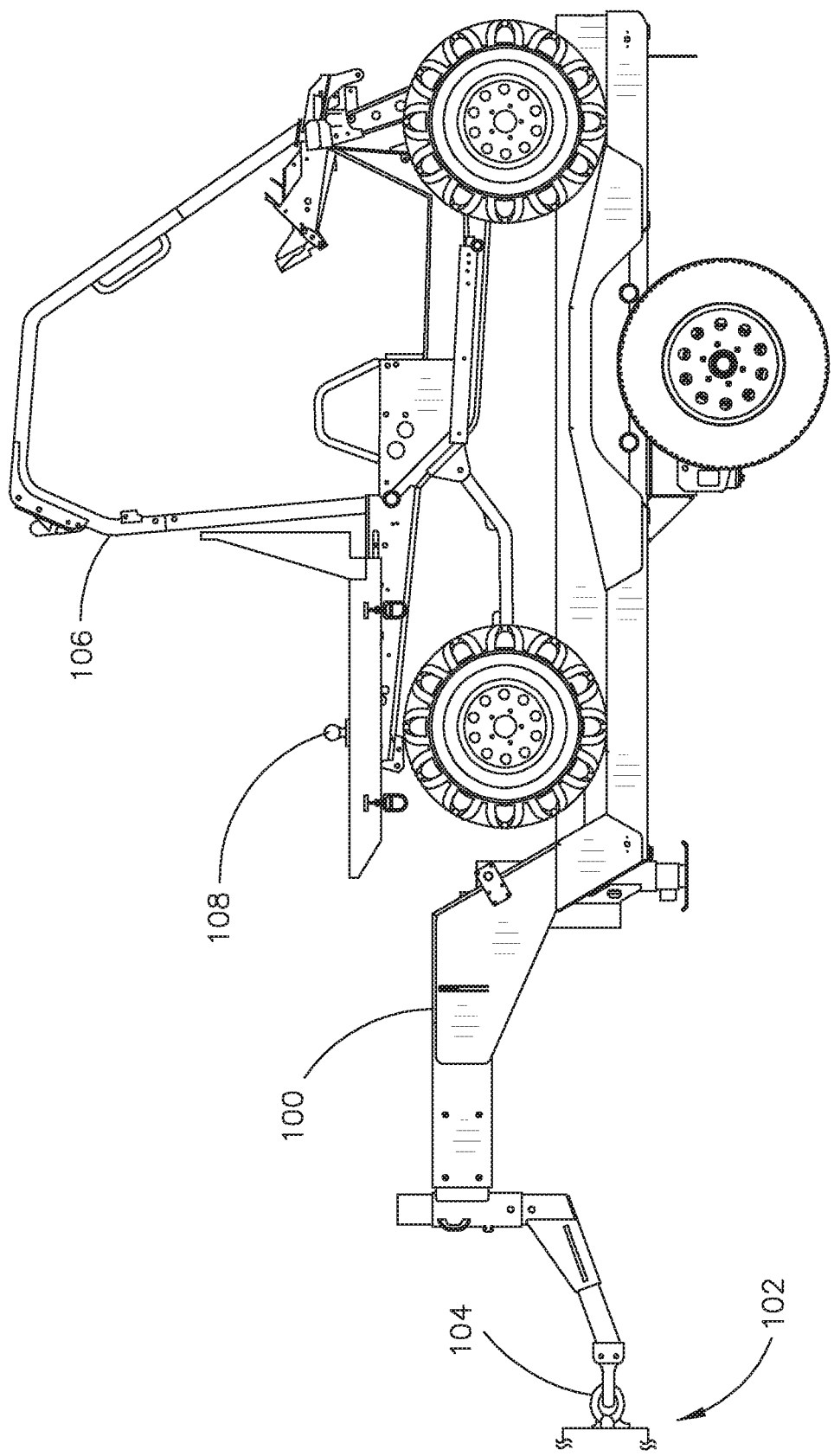
FIG. 1C illustrates a vehicle situated on a trailer configured for multiple hitches, in accordance with one or more embodiments of the present disclosure.
Figure 1D:
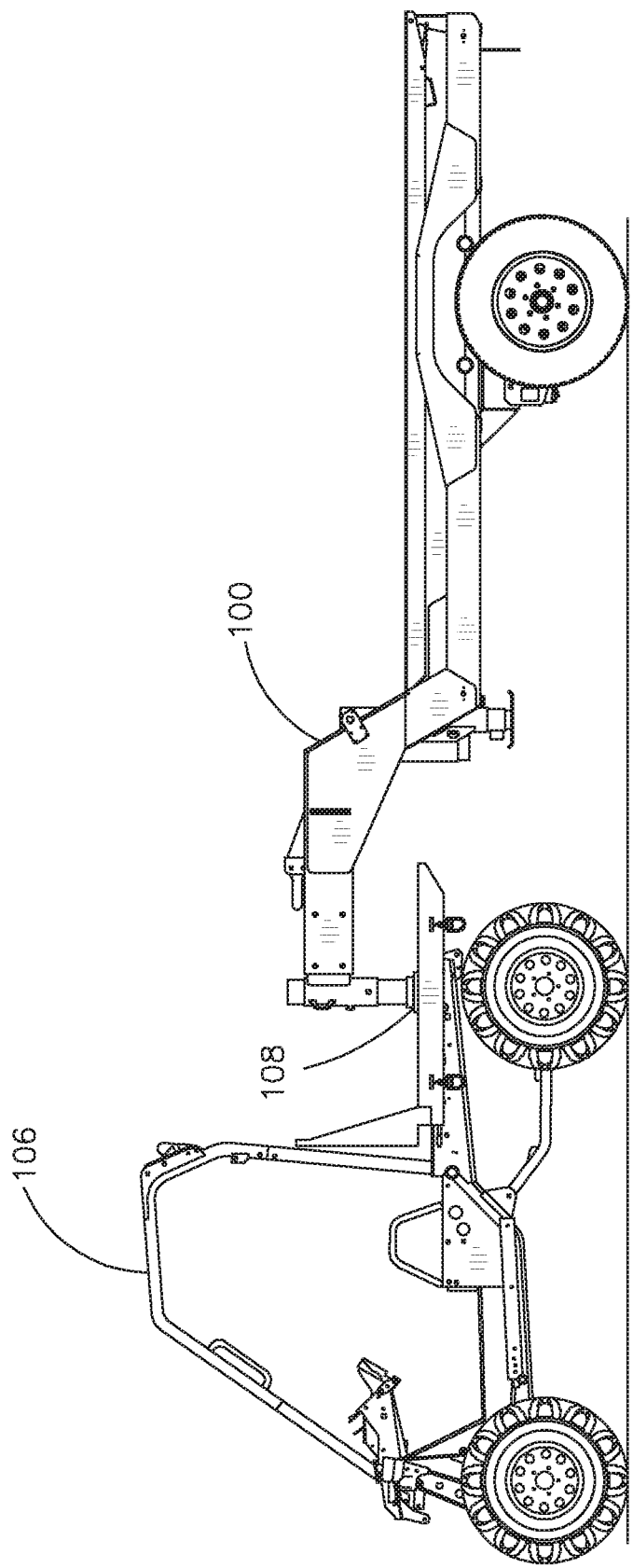
FIG. 1D illustrates a trailer configured for multiple hitches coupled to a vehicle, in accordance with one or more embodiments of the present disclosure.
Figure 2A:
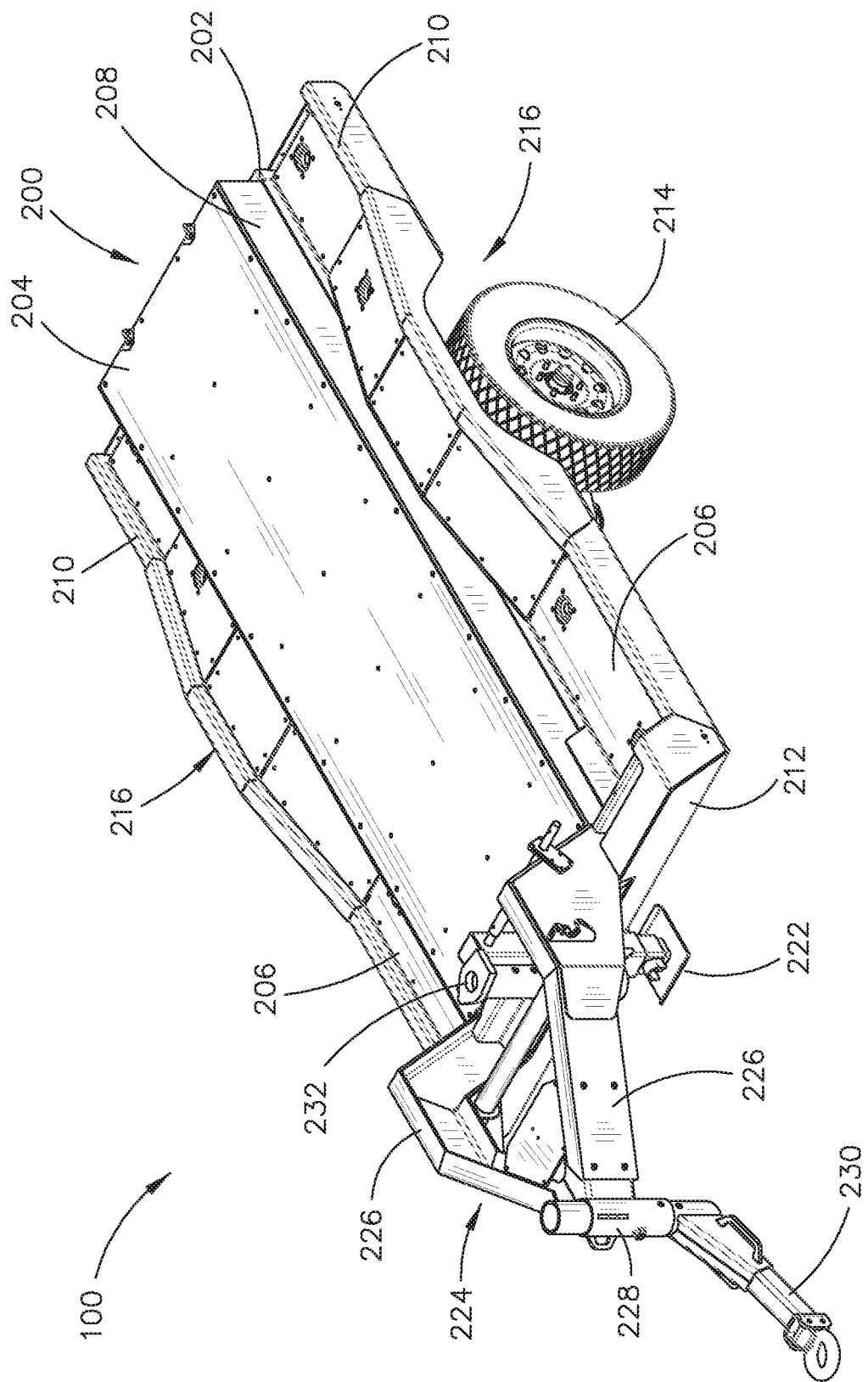
FIG. 2A illustrates a perspective view of a trailer configured for multiple hitches, in accordance with one or more embodiments of the present disclosure.
Figure 2B:
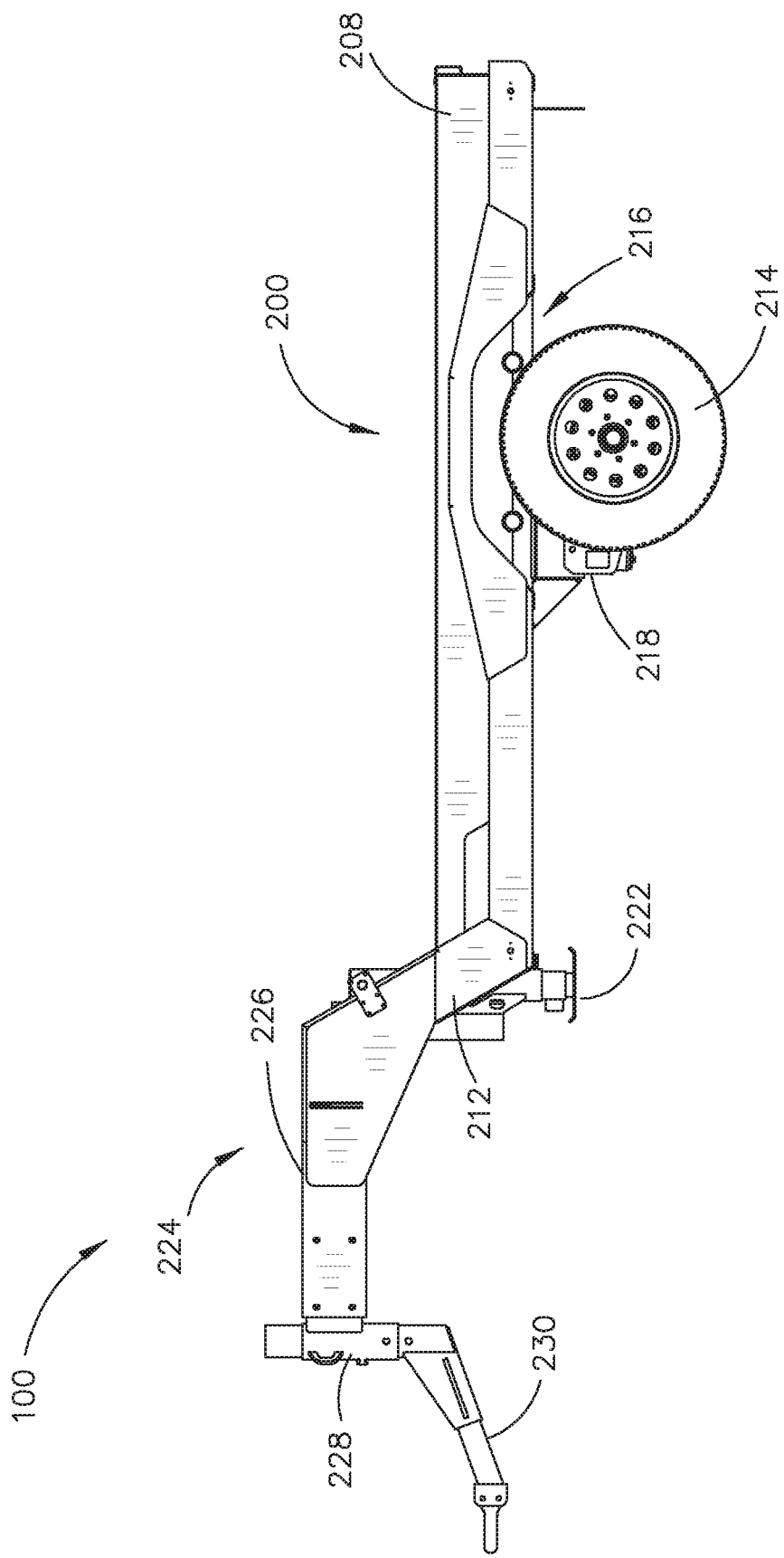
FIG. 2B illustrates a side view of a trailer configured for multiple hitches, in accordance with one or more embodiments of the present disclosure.
Figure 2C:
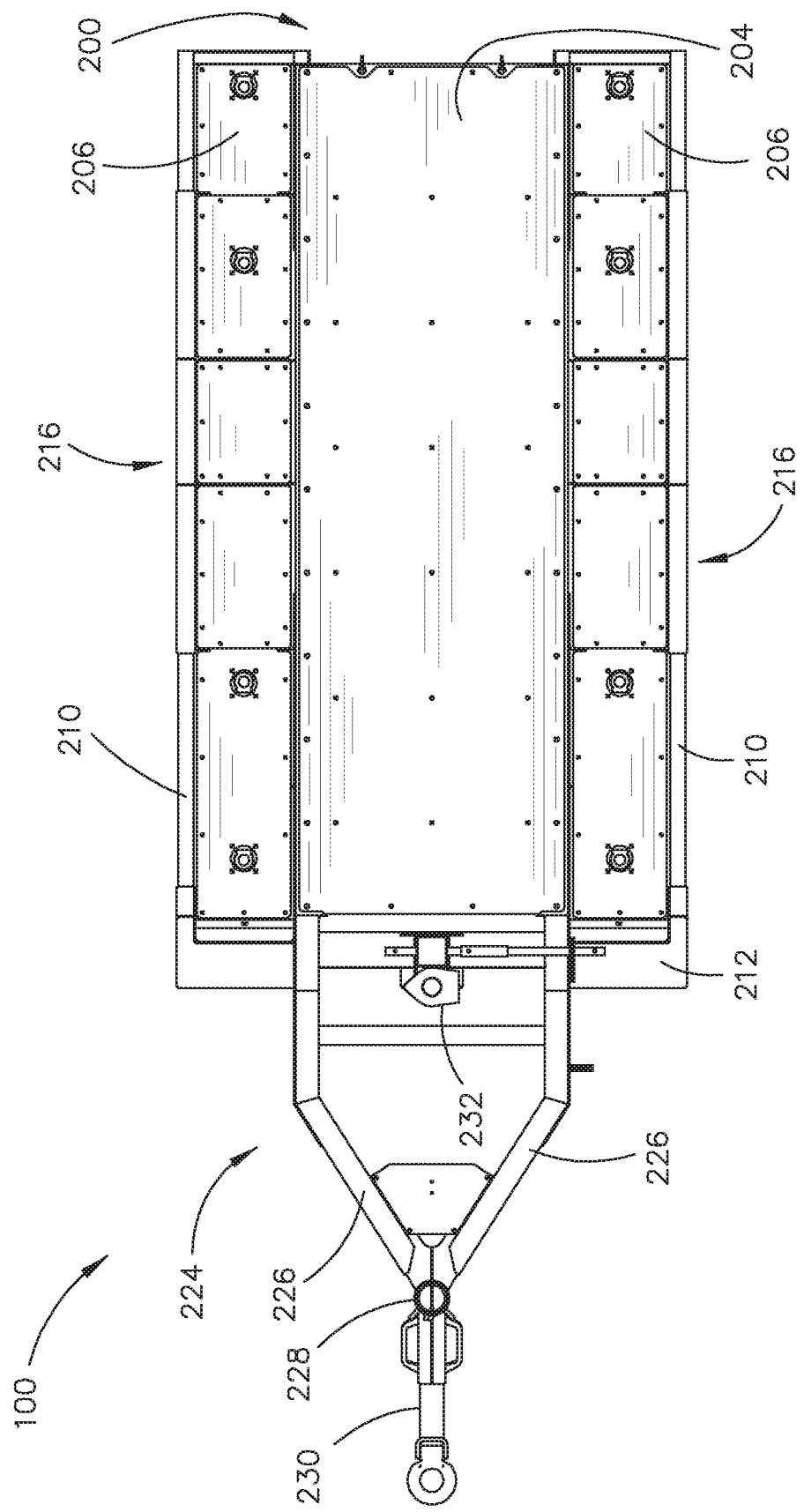
FIG. 2C illustrates a top view of a trailer configured for multiple hitches, in accordance with one or more embodiments of the present disclosure.
Figure 2D:
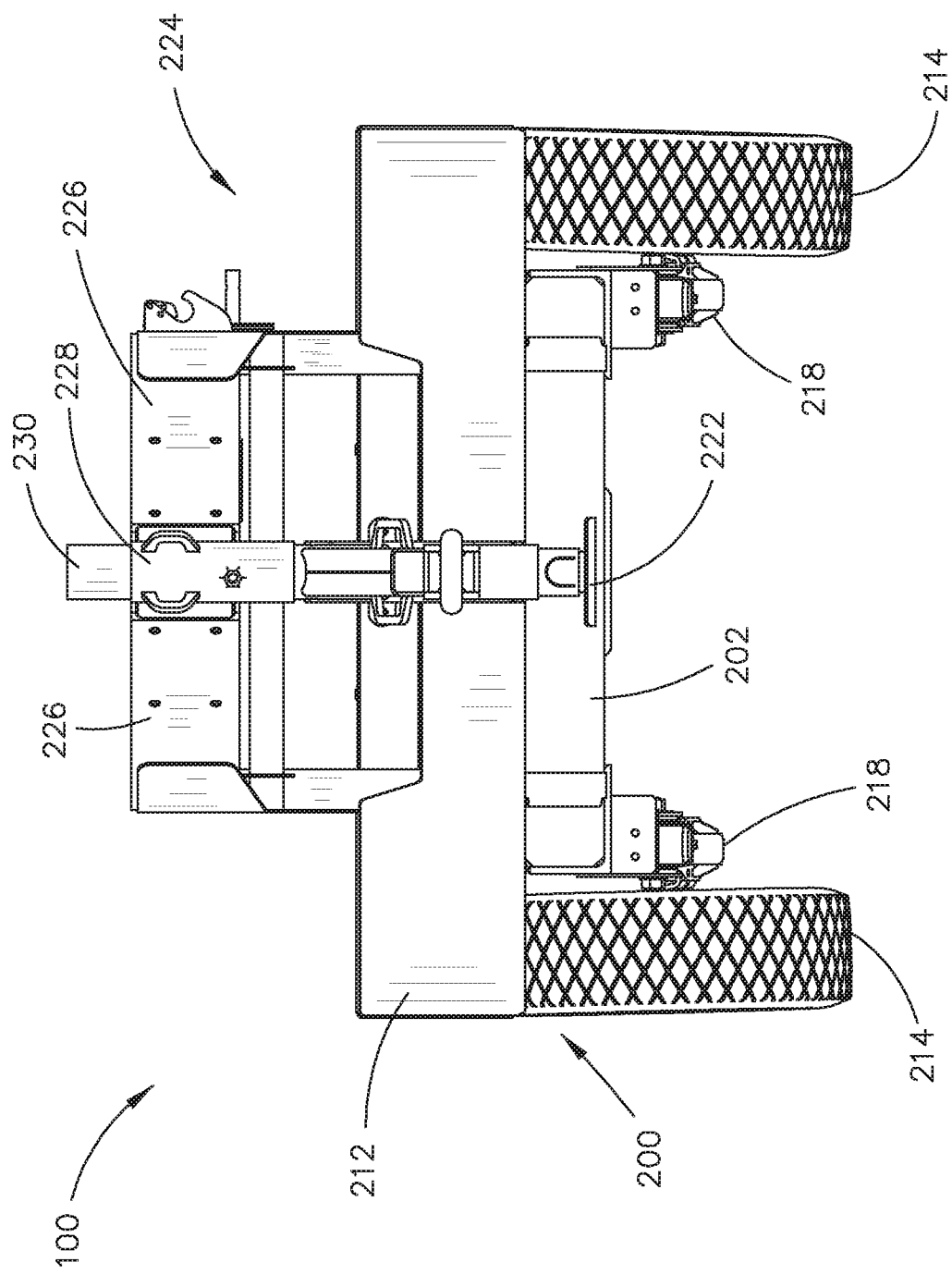
FIG. 2D illustrates a front view of a trailer configured for multiple hitches, in accordance with one or more embodiments of the present disclosure.
Figure 2E:
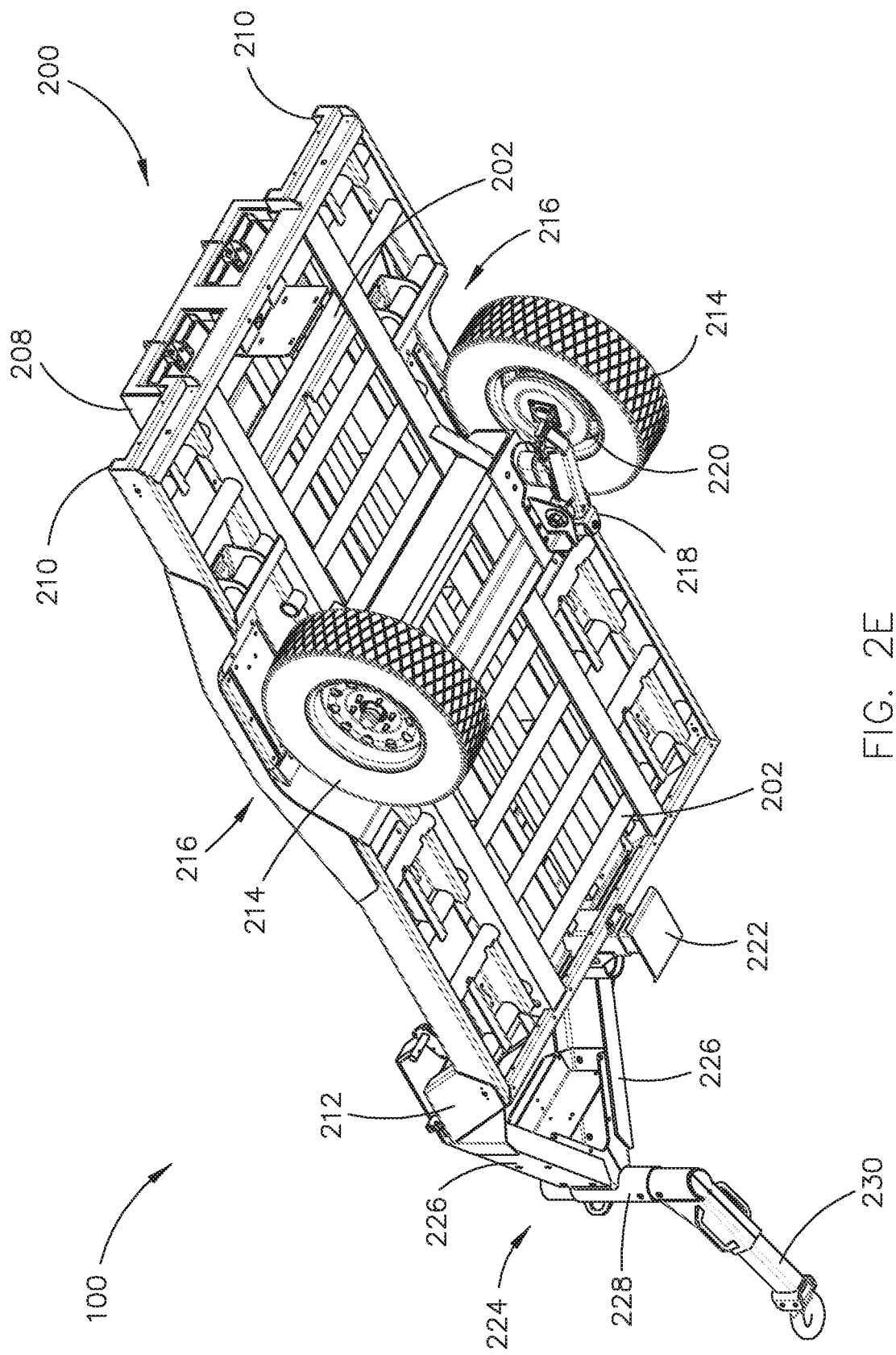
FIG. 2E illustrates a perspective view of a trailer configured for multiple hitches, in accordance with one or more embodiments of the present disclosure.
Figure 2F:
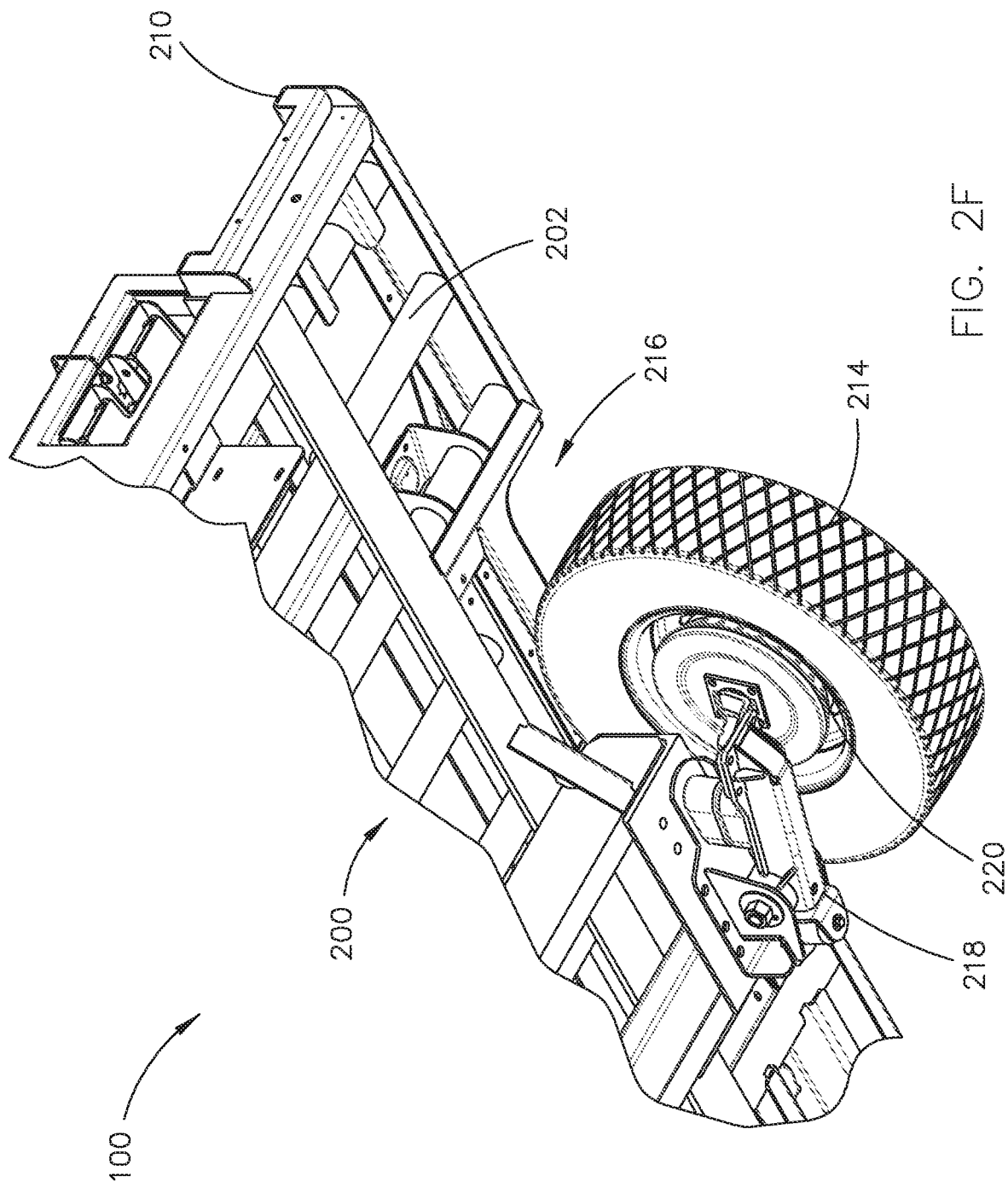
FIG. 2F illustrates a partial perspective view of a trailer configured for multiple hitches, in accordance with one or more embodiments of the present disclosure.

Reference will now be made in detail to the subject matter disclosed, which is illustrated in the accompanying drawings.

FIGS. 1A-6K generally illustrate a trailer configured for multiple hitches, in accordance with one or more embodiments of the present disclosure.

Embodiments of the present disclosure are directed to a trailer configured for multiple hitches. Embodiments of the present disclosure are also directed to hauling a second vehicle capable of towing the trailer via a first vehicle coupled to the trailer. Embodiments of the present disclosure are also directed to couplers for converting the trailer to accept multiple hitches. Embodiments of the present disclosure are also directed to a set of ramps configured to stow within a recess on the trailer and couple to a surface of the trailer.

Referring generally to FIGS. 1A-1D, a trailer 100 configured for multiple hitches coupled to a vehicle is illustrated, in accordance with one or more embodiments of the present disclosure.

In one embodiment, the trailer 100 is couplable to a vehicle 102 via a hitch. For example, the vehicle 102 may include, but is not limited to, any commercial vehicle, construction vehicle, military vehicle, or the like known in the art. For instance, the vehicle 102 may include a high mobility multi-purpose wheeled vehicle (HMMWV or Humvee). By way of another example, the hitch may include a hitch positioned behind a rear axle of the vehicle 102 including a pintle hitch, a rear receiver hitch, a bumper hitch, a weight distribution hitch, or the like. For instance, the hitch may include a pintle hitch, such that the vehicle 102 includes a pintle hook 104. It is noted herein the vehicle 102 may be any vehicle mounted with, or configured to receive a mount including, any pintle hook or combination pintle hook-and-ball known in the art.

In another embodiment, the trailer 100 is configured to haul a vehicle 106. For example, the vehicle 106 may include, but is not limited to, a utility task vehicle (UTV), a recreational off-highway vehicle (ROV), a multipurpose off-highway utility vehicle (ROHUV), an all-terrain vehicle (ATV), a personal tracked vehicle (PTV), or the like. For instance, the vehicle 106 may include a military duty UTV. It is noted herein the vehicle 106 may include any side-by-side, three-wheeler, four-wheeler, six-wheeler, tracked vehicle, or mini tracked vehicle known in the art.

In another embodiment, the vehicle 106 is couplable to the trailer 100 via a hitch. For example, the hitch may include a hitch positioned over (or just in front of) a rear axle of the vehicle 106 including a gooseneck, a fifth wheel hitch, or the like. For instance, the hitch may include a gooseneck hitch, such that the vehicle 106 includes a gooseneck receiver hitch 108. It is noted herein, however, that the hitch may include a hitch positioned behind a rear axle of the vehicle 106 (e.g., a pintle hitch, such that the vehicle 106 includes a pintle hook). Therefore, the above description should not be interpreted as a limitation on the present disclosure but merely an illustration.

Although embodiments of the present disclosure are directed to the various hitch assemblies coupled to the vehicle 102 and vehicle 106 as including a pintle hitch or a gooseneck hitch, it is noted herein the various hitch assemblies may include any type of hitch known in the art. For example, the various hitch assemblies may include, but are not limited to, a gooseneck, a pintle hitch, a rear receiver hitch, a fifth wheel hitch, a bumper hitch, a weight distribution hitch, or the like. Therefore, the above description should not be interpreted as a limitation on the present disclosure but merely an illustration.

Referring generally to FIGS. 2A-2F, the trailer 100 is illustrated, in accordance with one or more embodiments of the present disclosure.

In one embodiment, the trailer 100 includes a trailer bed 200. In another embodiment, the trailer bed 200 includes a trailer frame 202. For example, the trailer frame 202 may be fabricated from one or more beams. For instance, the trailer frame 202 may be fabricated from one centered beam, with the trailer bed 200 extending in one or more directions from the centered beam. By way of another example, the trailer frame 202 may be fabricated from two or more beams. For instance, the two or more beams may be coupled together via one or more cross-members and/or one or more plates, where the one or more cross-members and/or the one or more plates are set either orthogonal to the two or more beams or at an angle to the two or more beams. In addition, the two or more beams may be arranged to form multiple layers in the trailer frame 202 (e.g., an upper frame portion and a lower frame portion).

In another embodiment, the trailer bed 200 includes a platform 204. For example, the platform 204 may be coupled to the trailer frame 202. By way of another example, the trailer bed 200 may be fabricated from one or more sections. For instance, the one or more sections may be coupled to the trailer frame 202. In addition, the one or more sections may be planar or substantially planar.

In another embodiment, the trailer bed 200 includes one or more runners 206. For example, the trailer bed 200 may include a runner 206 on each side of the platform 204. In another embodiment, the one or more runners 206 are dimensioned to accept one or more wheels of the vehicle 106. In another embodiment, the one or more runners 206 are recessed a selected depth relative to the platform 204, such that a sidewall 208 connects the one or more runners 206 and the platform 204. For example, the sidewall 208 of the platform 204 may be configured to guide the vehicle 106 and/or prevent the vehicle 106 from dismounting along a side of the trailer 100 during loading/unloading and/or transport. In another embodiment, the one or more runners 206 include one or more drainage holes. In another embodiment, the one or more runners 206 include one or more bracket mount and/or tie-down points.

In another embodiment, the trailer bed 200 includes one or more rails 210. For example, the trailer bed 200 may include a rail 210 along an outside edge of the one or more runners 206. For instance, where there are two runners 206, the trailer bed 200 may include a rail 210 along the outside edge of the two runners 206. By way of another example, the one or more rails 210 may be configured to prevent the vehicle 106 from dismounting along a side of the trailer 100. For instance, the one or more rails 210 may be configured to guide the vehicle 106 and/or prevent the vehicle 106 from dismounting along a side of the trailer 100 during loading/unloading and/or transport. In addition, the one or more rails 210 may be configured to prevent the one or more wheels of the vehicle 106 from dismounting along a side of the trailer 100 during transport of the vehicle 106.

In another embodiment, the trailer 100 includes one or more wheel blocks 212. For example, the one or more wheel blocks 212 may include a surface set at an angle from a corresponding runner 206. For instance, the angle of the surface may be large enough to prevent the vehicle 106 from dismounting from (e.g. rolling off) the front of the trailer 100 during loading/unloading or transport.

In another embodiment, the trailer 100 includes two or more wheels 214. For example, the trailer 100 may include one or more sets of two wheels 214, with a wheel of the two wheels 214 on each side of the trailer frame 202 (e.g., a single rear wheel arrangement). It is noted herein, however, that the trailer 100 may include one or more sets of four wheels 214, with two wheels of the four wheels 214 on each side of the trailer frame 202 (e.g., a dual rear wheel, or "dually", arrangement). Therefore, the above description should not be interpreted as a limitation on the present disclosure but merely an illustration.

In another embodiment, the trailer 100 includes one or more wheel wells 216 for the two or more wheels 214. For example, the trailer 100 may include a wheel well 216 on each side of the platform 204, where each wheel well 216 is arched over a wheel 214. In another embodiment, the one or more runners 206 map to the shape of the one or more wheel wells 216. In another embodiment, the one or more runners 206 include one or more raised sections that map or conform to the one or more wheel wells 216. In this regard, the two or more wheels 214 may be substantially located within the width of the trailer 100, such that the wheels 214 do not add substantial width beyond in addition to the combined width of the platform 204 and the one or more runners 206.

It is noted herein, however, that the two or more wheels 214 may be coupled low enough to the trailer frame 202 and/or the one or more runners 206 are coupled high enough to the trailer frame 202 the that the one or more runners 206 are flat and do not include the wheel well 216. Therefore, the above description should not be interpreted as a limitation on the present disclosure but merely an illustration.

In another embodiment, the two or more wheels 214 are coupled to the trailer frame 202 via one or more axle components and/or suspension components. For example, where the two or more wheels 214 are coupled to the trailer frame 202 via an independent suspension arm, each wheel 214 may include an independent suspension arm 218 that allow the wheel 214 to independently flex when traversing over terrain to help to stabilize the platform 204 of the trailer 100. In this regard, each wheel 214 is on a standalone axle and suspension system. It is noted herein, however, that the suspension components may be coupled together, such that fully independent flexing is not possible. In addition, it is noted herein that the trailer frame 202 may include one or more axle components for the two or more wheels 214 to be coupled together via a solid axle (e.g., brackets, bearings, leaf springs, shocks, struts, or the like).

In another embodiment, the trailer 100 includes a brake assembly 220 for the two or more wheels 214. For example, the brake assembly 220 may include an electric brake controllable by the vehicle 102 and/or the vehicle 106 via a trailer connector (e.g., a 4-pin, 5-pin, 6-pin, or 7-pin trailer connector). By way of another example, the brake assembly 220 may include a hydraulic brake. By way of another example, the brake assembly 220 may include a mechanical brake.

In another embodiment, the trailer 100 includes a jack 222. For example, the jack 222 may be configured to provide support at the front of the trailer 100 during loading/unloading of the vehicle 106. For instance, the jack 222 may be engaged when the vehicle 102 is uncoupled from the trailer 100. In the alternative, the jack 222 may be engaged when the vehicle 102 is still coupled to the trailer 100. In another embodiment, the jack 222 is mechanically-actuated. For example, the jack 222 may be actuated via a handle that is detachable and/or pivotable relative to the jack 222 on the trailer 100. It is noted herein the trailer 100 may include a mount point for a handle of the jack 222. In another embodiment, the jack 222 is electrically-actuated or hydraulically-actuated.

In another embodiment, the trailer 100 includes a draw bar assembly 224. In another embodiment, the draw bar assembly 224 includes one or more draw bar arms 226 arranged to form a gooseneck assembly. For example, the one or more draw bar arms 226 may be coupled together via one or more cross-members and/or one or more plates, where the one or more cross-members and/or one or more plates are set either orthogonal to the two or more beams or at an angle to the two or more beams. In another embodiment, the jack 222 is positioned between the one or more draw bar arms 226 of the draw bar assembly 224.

In one embodiment, the trailer 100 includes a convertible hitch assembly. In another embodiment, the convertible hitch assembly includes a hitch converter 228. For example, the hitch converter 228 may be coupled to the draw bar assembly 224. For instance, the hitch converter 228 may be coupled to the one or more draw bar arms 226 of the draw bar assembly 224. In another embodiment, the convertible hitch assembly may include one or more hitch couplers, where the hitch converter 228 is configured to receive the one or more hitch couplers. For example, the convertible hitch assembly may include a behind-axle hitch coupler (e.g., the behind-axle hitch coupler is insertable in the hitch converter 228). For instance, the behind-axle hitch coupler may include, but is not limited to, a lunette ring coupler 230 for the pintle hook 104 of the vehicle 102. By way of another example, the convertible hitch assembly may include an over-axle hitch coupler (e.g., the over-axle hitch coupler is insertable in the hitch converter 228). For instance, the over-axle hitch coupler may include, but is not limited to, a gooseneck coupler 232 for the gooseneck hitch of the vehicle 106, such that the gooseneck coupler 232 is insertable in the hitch converter 228. It is noted herein the convertible hitch assembly may include a hitch coupler for any hitch known in the art including, but not limited to, a hitch positioned over (or just in front of) a rear axle such as a gooseneck, a fifth wheel hitch, or the like; or a hitch positioned behind the rear axle such as a pintle hitch, a rear receiver hitch, a bumper hitch, a weight distribution hitch, or the like.

In another embodiment, the draw bar assembly 224 includes one or more handles configured to assist in moving the trailer 100. In another embodiment, the draw bar assembly 224 includes one or more loops configured to couple to a set of chains or safety cables between the trailer 100 and the vehicle 102 and/or vehicle 106. In another embodiment, the draw bar assembly 224 includes one or more locking assemblies.

Referring generally to FIGS. 3A-3C, the lunette ring coupler 230 is illustrated, in accordance with one or more embodiments of the present disclosure. In one embodiment, the lunette ring coupler 230 includes a lunette eye or ring 300. In another embodiment, the lunette ring coupler 230 includes a converter stem 302. For example, the converter stem 302 is insertable within the hitch converter 228. In another embodiment, the lunette ring 300 is coupled to the converter stem 302 via a draw bar arm 304 and/or a bracket (e.g., quick-connect bracket, standard mount bracket, or the like) 306.

In one embodiment, the trailer is convertible from an over-axle hitch to a behind-axle hitch. Referring generally to FIGS. 4A-4E, a set of processes for switching the lunette ring coupler 230 and the gooseneck coupler 232 is illustrated, in accordance with one or more embodiments of the present disclosure. It is noted herein the set of processes in FIGS. 4A-4E are not limited to the processes provided. For example, the set of processes in FIGS. 4A-4E may instead include more or fewer processes. By way of another example, the set of processes in FIGS. 4A-4E may perform the processes in an order other than provided. Therefore, the above description should not be interpreted as a limitation on the scope of the present disclosure, but merely an illustration.

In one embodiment, the trailer 100 includes a coupler bracket 400. In another embodiment, the gooseneck coupler 232 includes a converter stem 402. For example, the converter stem 402 is insertable within the hitch converter 228 and/or the coupler bracket 400. In another embodiment, the gooseneck coupler 232 includes a ball receiver 404 coupled to the converter stem 402.

In another embodiment, the converter stem 302 and/or the converter stem 402 are couplable to the hitch converter 228 and/or the coupler bracket 400 via a locking component. For example, the converter stem 302 may be couplable to the hitch converter 228 at a specific height, subsequently raising or lowering the lunette ring 300 relative to the height of the pintle hook 104 coupled to the vehicle 102. By way of another example, the converter stem 402 may be couplable to the hitch converter 228 at a specific height, subsequently raising or lowering the ball receiver 404 relative to the height the height of a gooseneck receiver hitch 108 coupled to the vehicle 106. In this regard, the lunette ring coupler 230 may be couplable to the hitch converter 228 in multiple positions, such that the trailer 100 may be configured for vehicles of different heights.

It is noted herein the locking component may include, but is not limited to, a hitch pin and cotter pin assembly (e.g., hairpin cotter pin, bowtie cotter pin, cotter ring/split ring, kickout ring, split pin, or the like), a locking pin (e.g., a square wire locking pin or a round wire locking pin), a clevis pin (with cotter pin, hairpin, split pin, or the like), a hitch pin, a quick-release pin, or the like. In addition, it is noted herein the locking component may include, but is not limited to, a lock bar of a padlock or combination lock, or the like. Further, it is noted herein the locking component may include, but is not limited to, a bolt and nut (e.g., hex nut, lock nut, wing nut, or the like) assembly, or the like. It is noted herein the locking component may include, but is not limited to, any locking component known in the art.

Figure 4A:
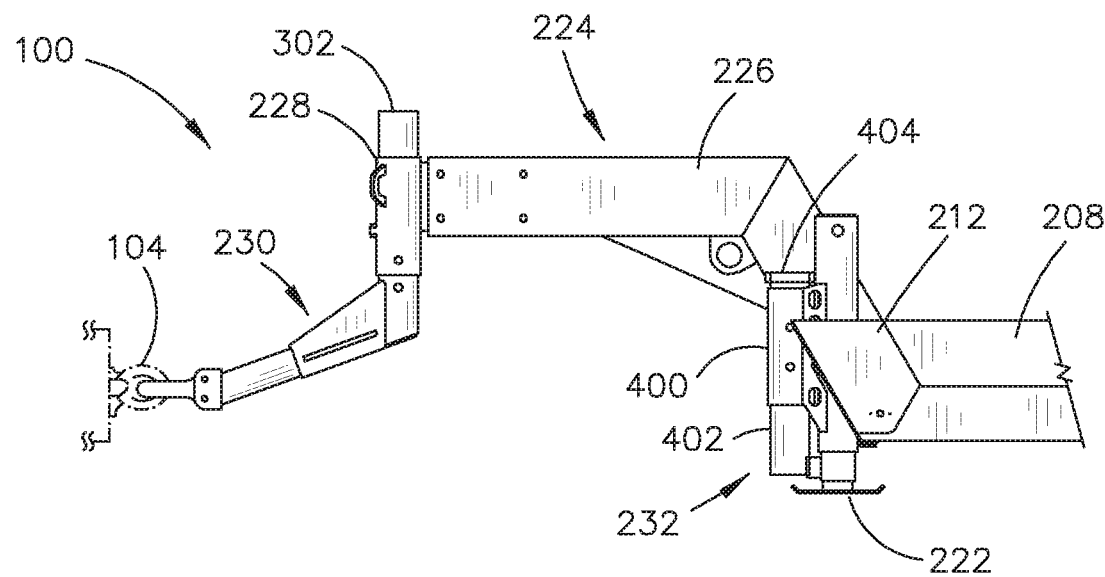
FIG. 4A illustrates a partial side view of a trailer configured for multiple hitches, in accordance with one or more embodiments of the present disclosure.
Figure 4B:
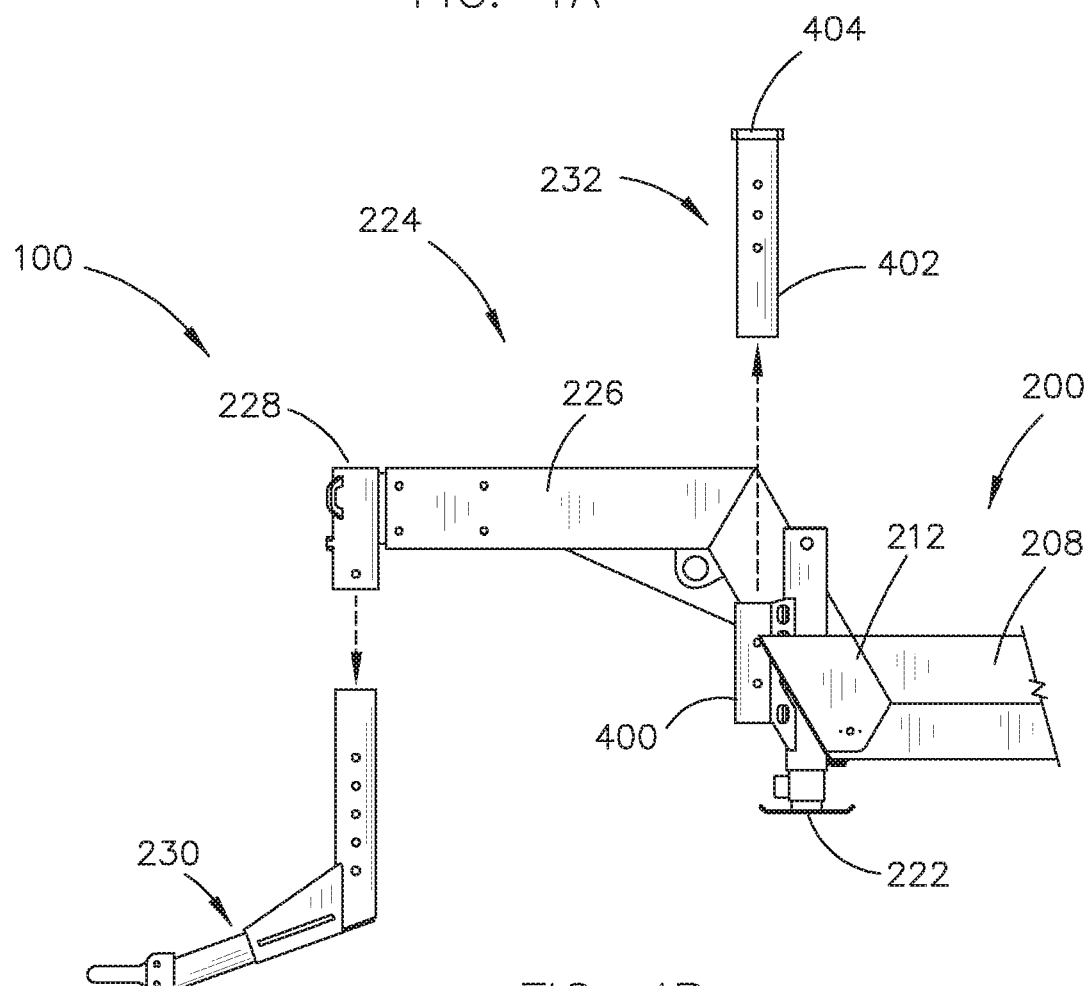
FIG. 4B illustrates a partial side view of a trailer configured for multiple hitches, in accordance with one or more embodiments of the present disclosure.
Figure 4C:
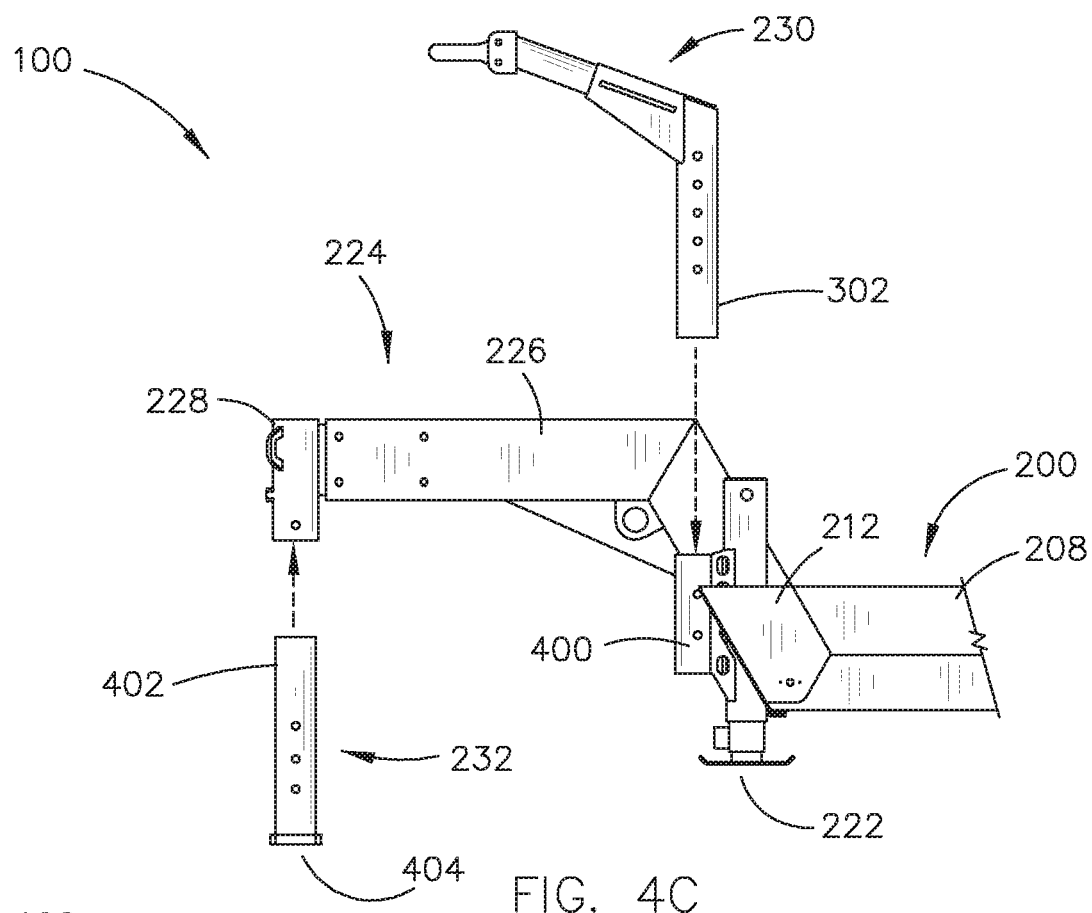
FIG. 4C illustrates a partial side view of a trailer configured for multiple hitches, in accordance with one or more embodiments of the present disclosure.
Figure 4D:
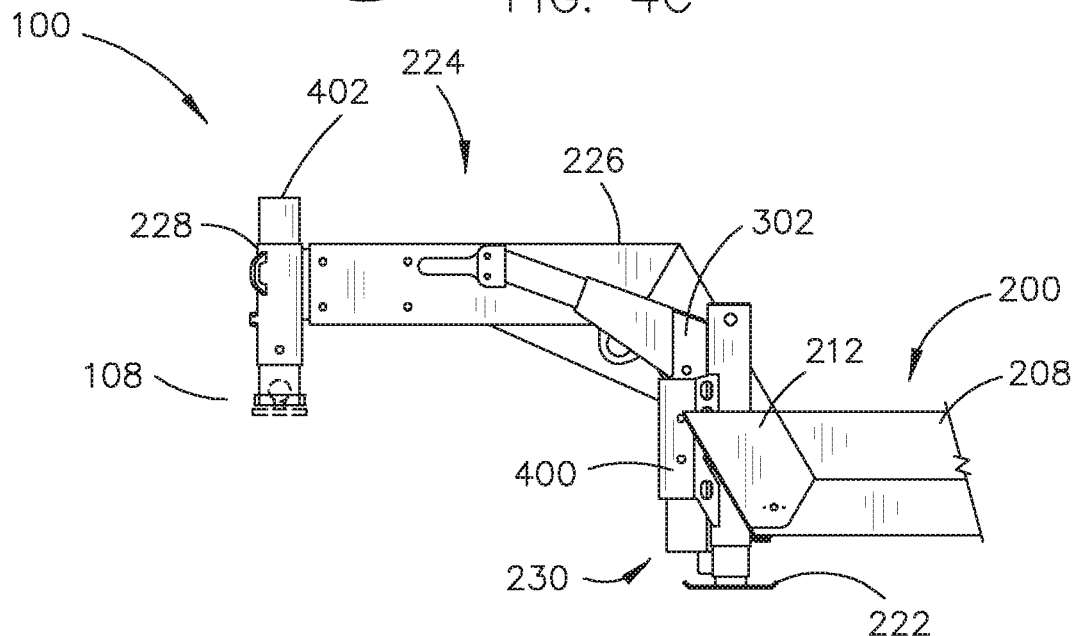
FIG. 4D illustrates a partial side view of a trailer configured for multiple hitches, in accordance with one or more embodiments of the present disclosure.
Figure 4E:
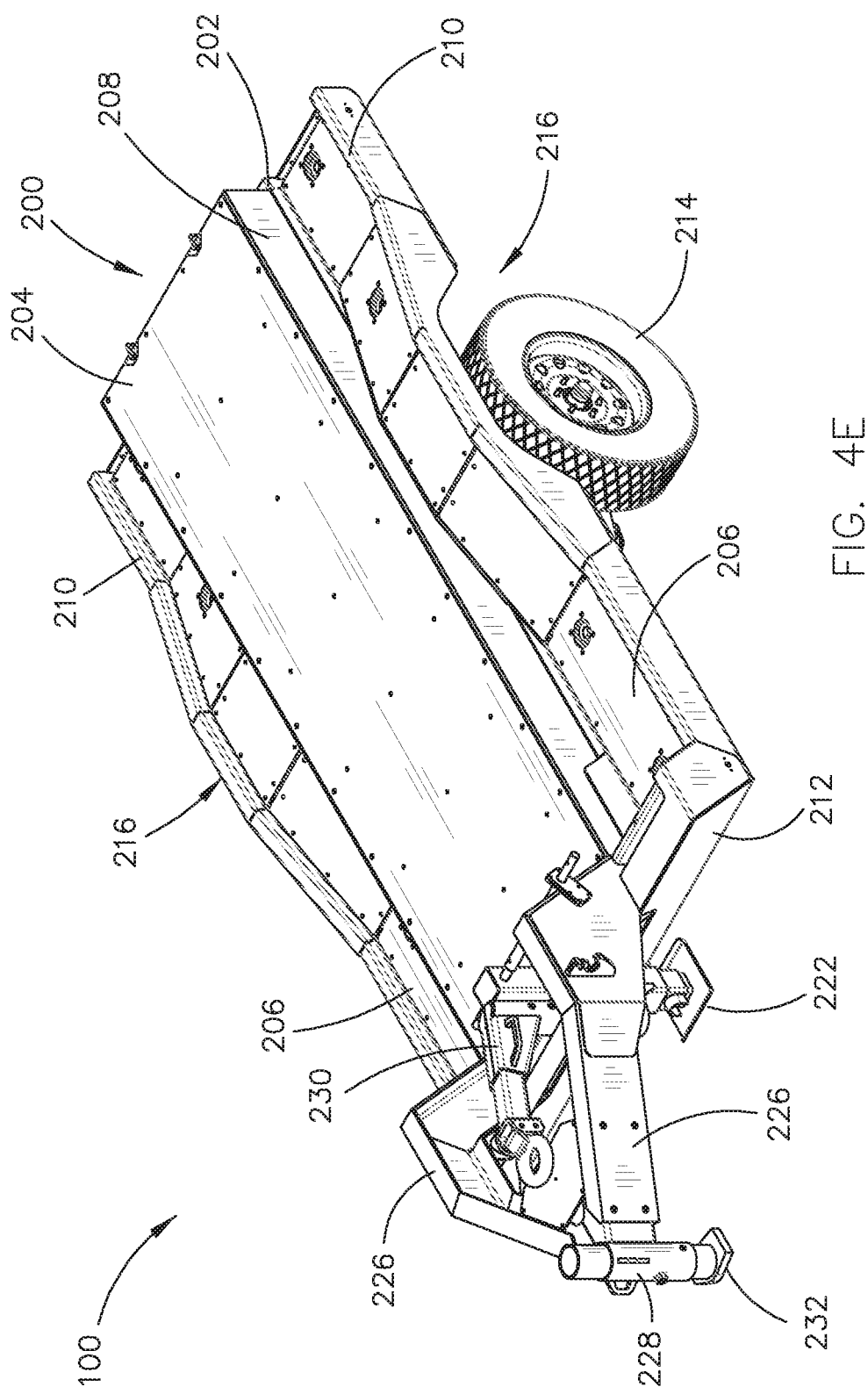
FIG. 4E illustrates a perspective view of a trailer configured for multiple hitches, in accordance with one or more embodiments of the present disclosure.
Figure 6A:
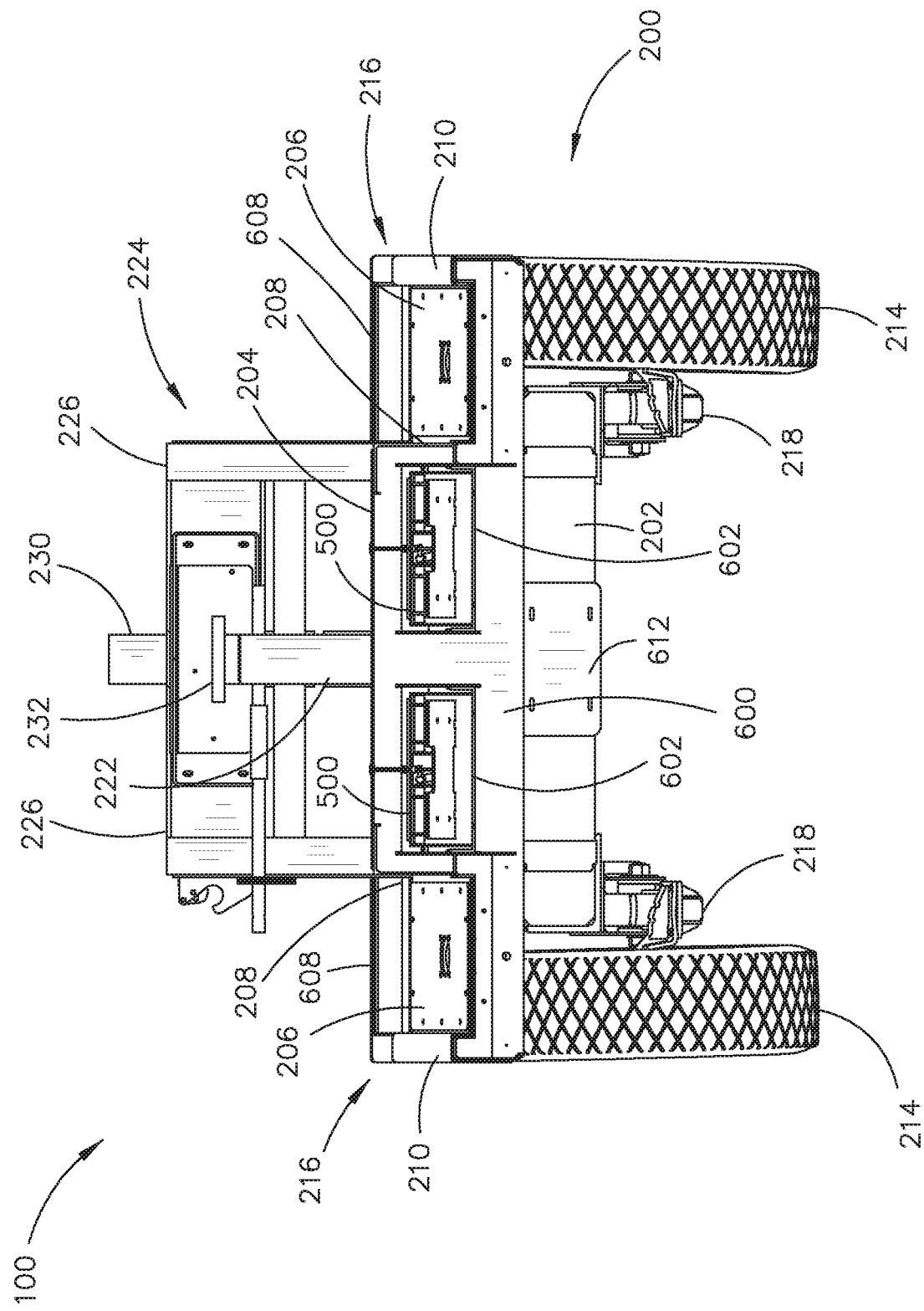
FIG. 6A illustrates a rear view of a trailer configured for multiple hitches, in accordance with one or more embodiments of the present disclosure.
Figure 6B:
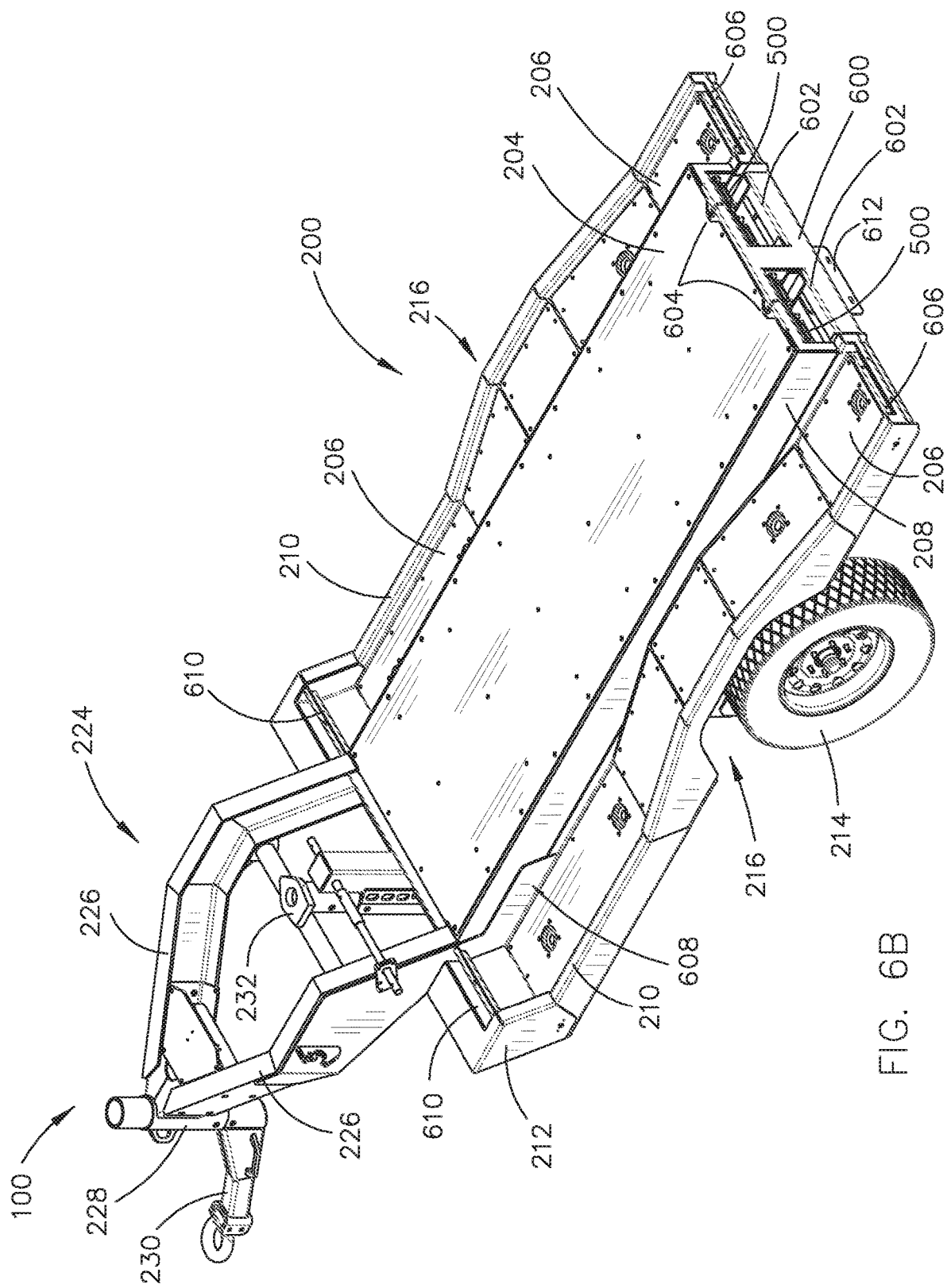
FIG. 6B illustrates a perspective view of a trailer configured for multiple hitches, in accordance with one or more embodiments of the present disclosure.
Figure 6C:
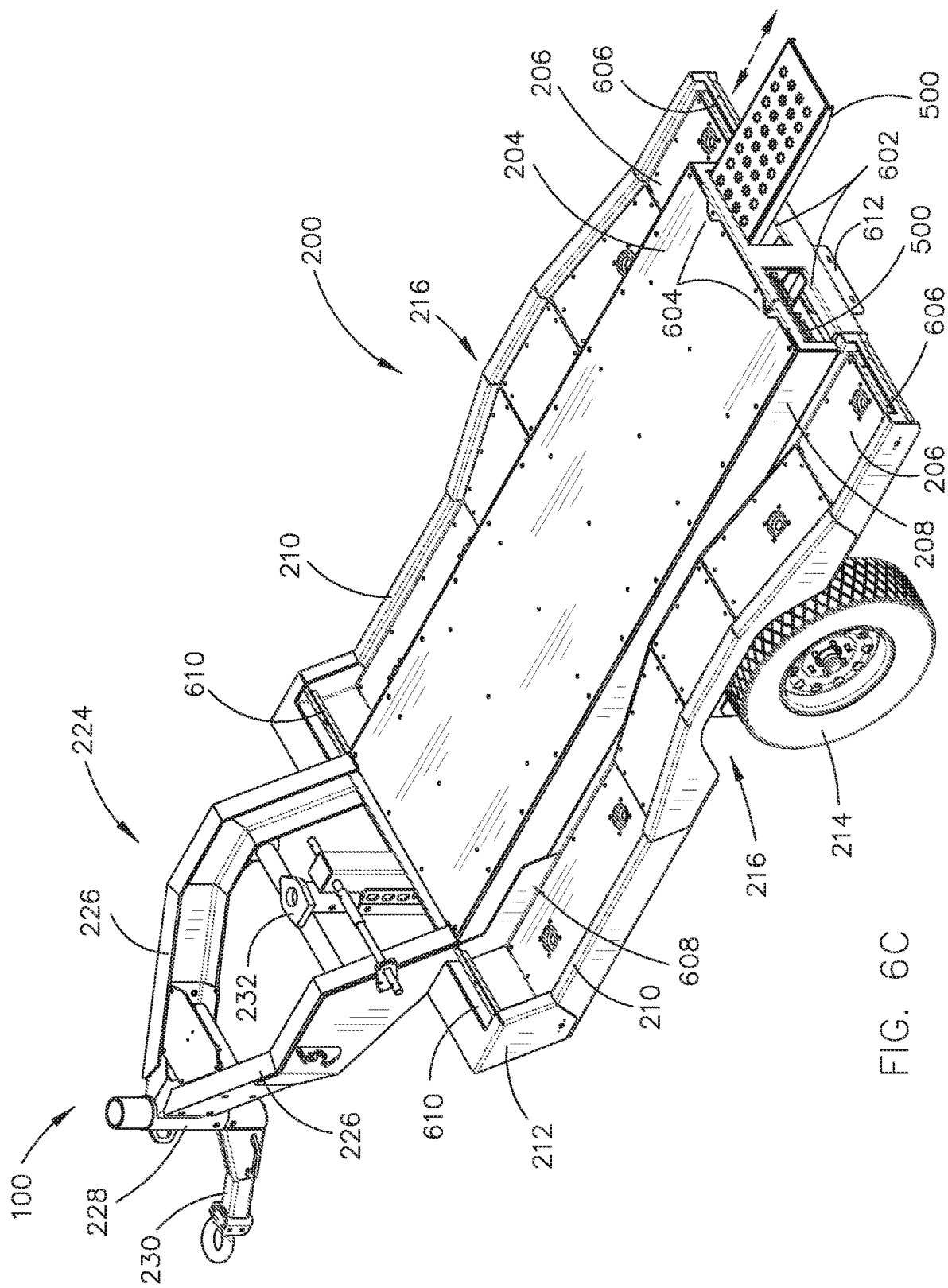
FIG. 6C illustrates a perspective view of a trailer configured for multiple hitches, in accordance with one or more embodiments of the present disclosure.
Figure 6E:
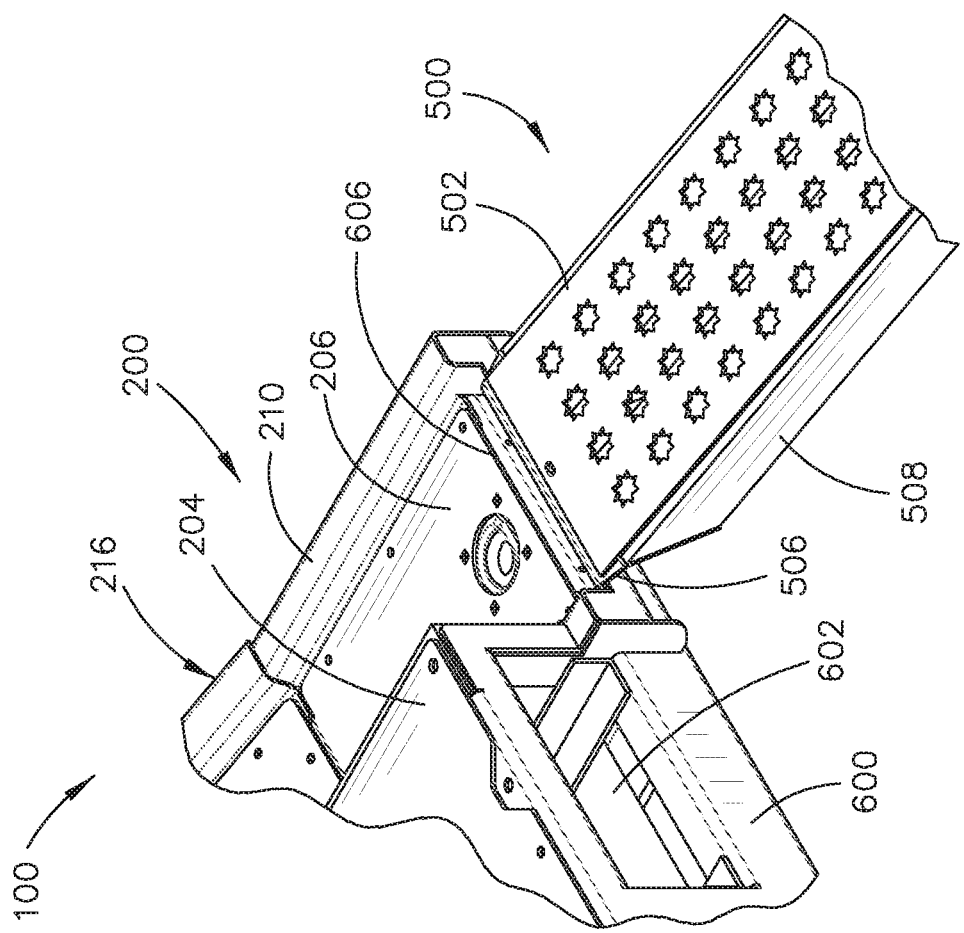
FIG. 6E illustrates a partial perspective view of a trailer configured for multiple hitches, in accordance with one or more embodiments of the present disclosure.
Figure 6D:
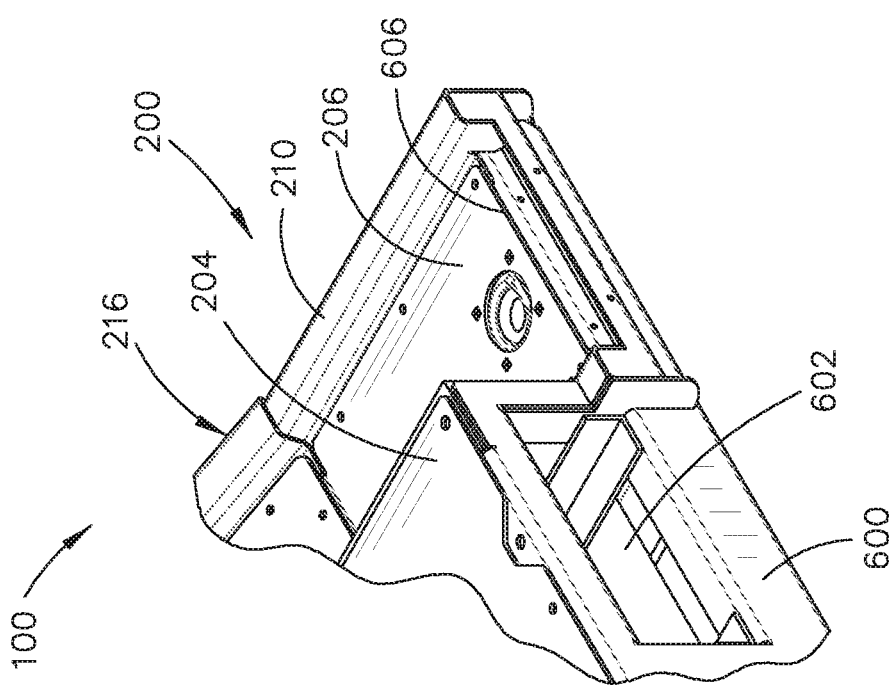
FIG. 6D illustrates a partial perspective view of a trailer configured for multiple hitches, in accordance with one or more embodiments of the present disclosure.
Figure 6F:
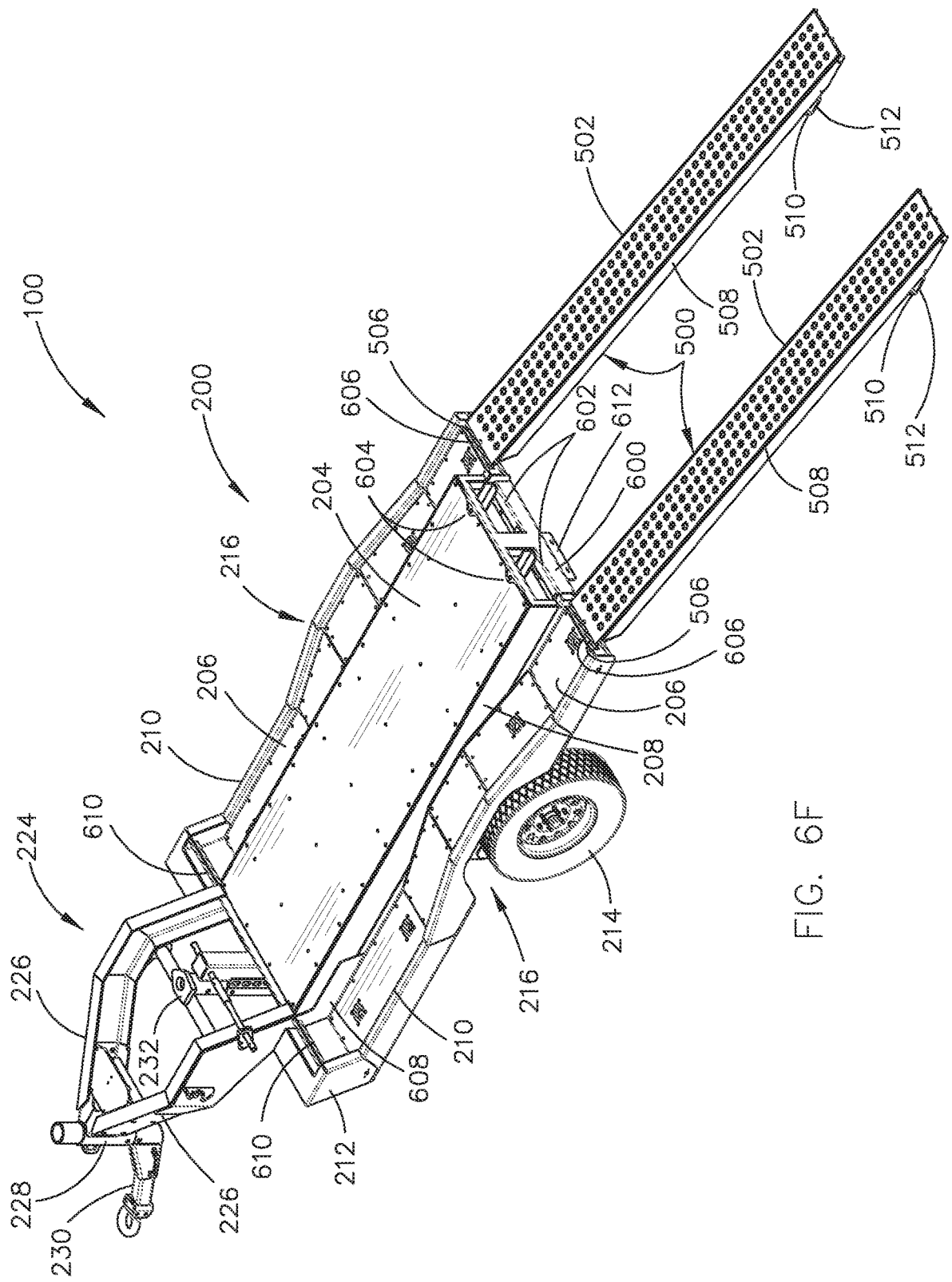
FIG. 6F illustrates a perspective view of a trailer configured for multiple hitches, in accordance with one or more embodiments of the present disclosure.
Figure 6G:
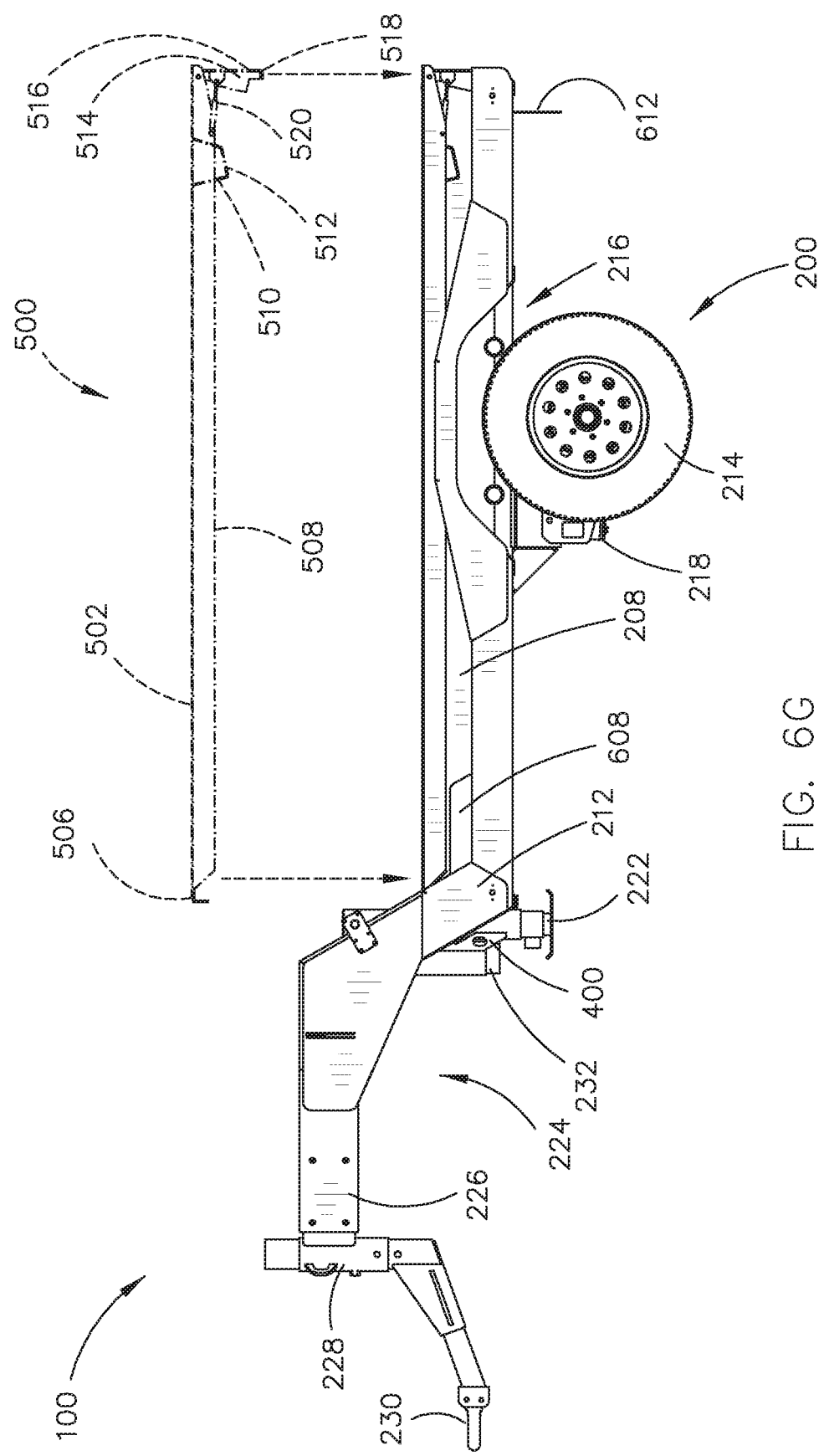
FIG. 6G illustrates a side view of a trailer configured for multiple hitches, in accordance with one or more embodiments of the present disclosure.
Figure 6H:
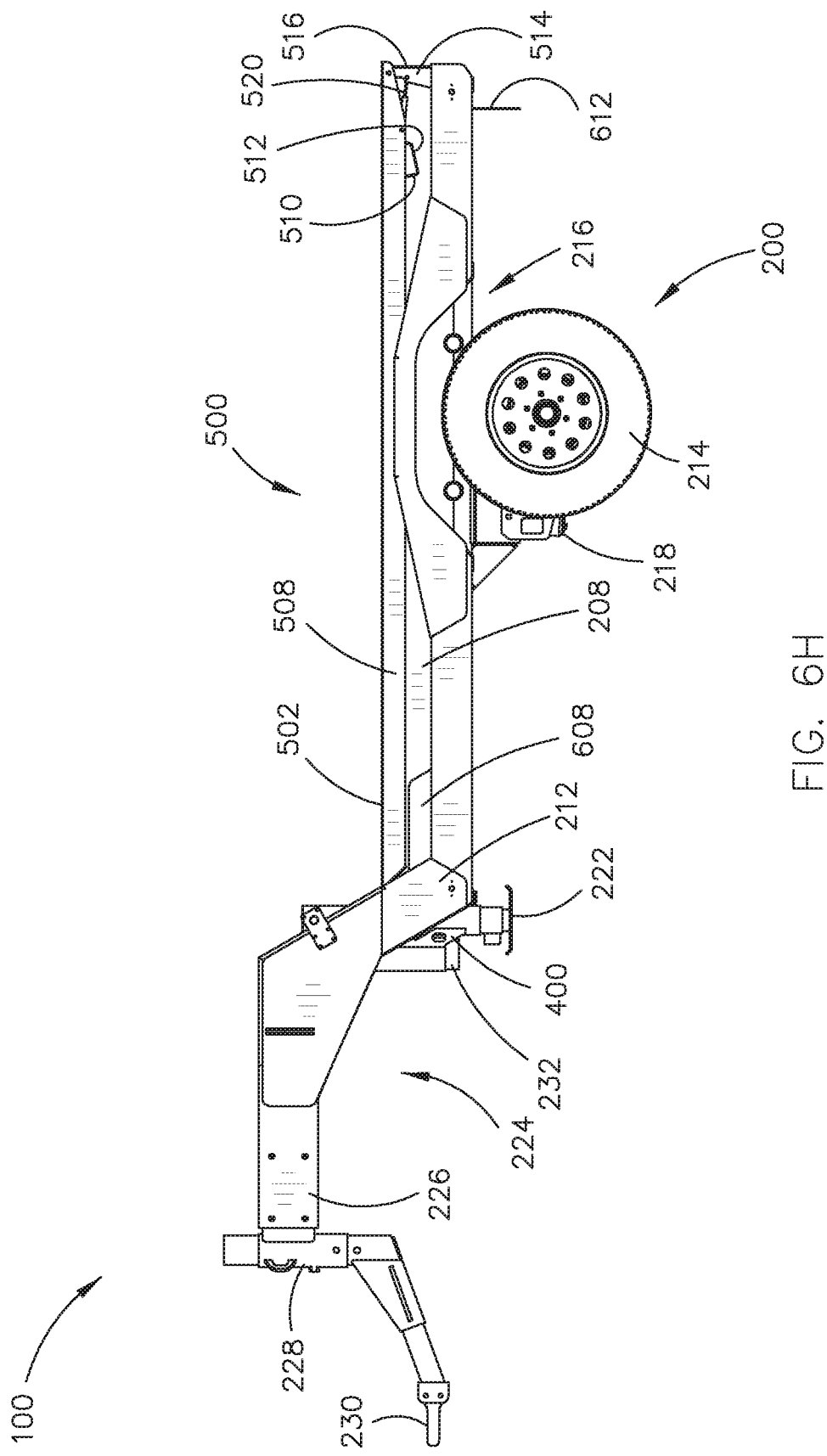
FIG. 6H illustrates a side view of a trailer configured for multiple hitches, in accordance with one or more embodiments of the present disclosure.
Figure 6I:
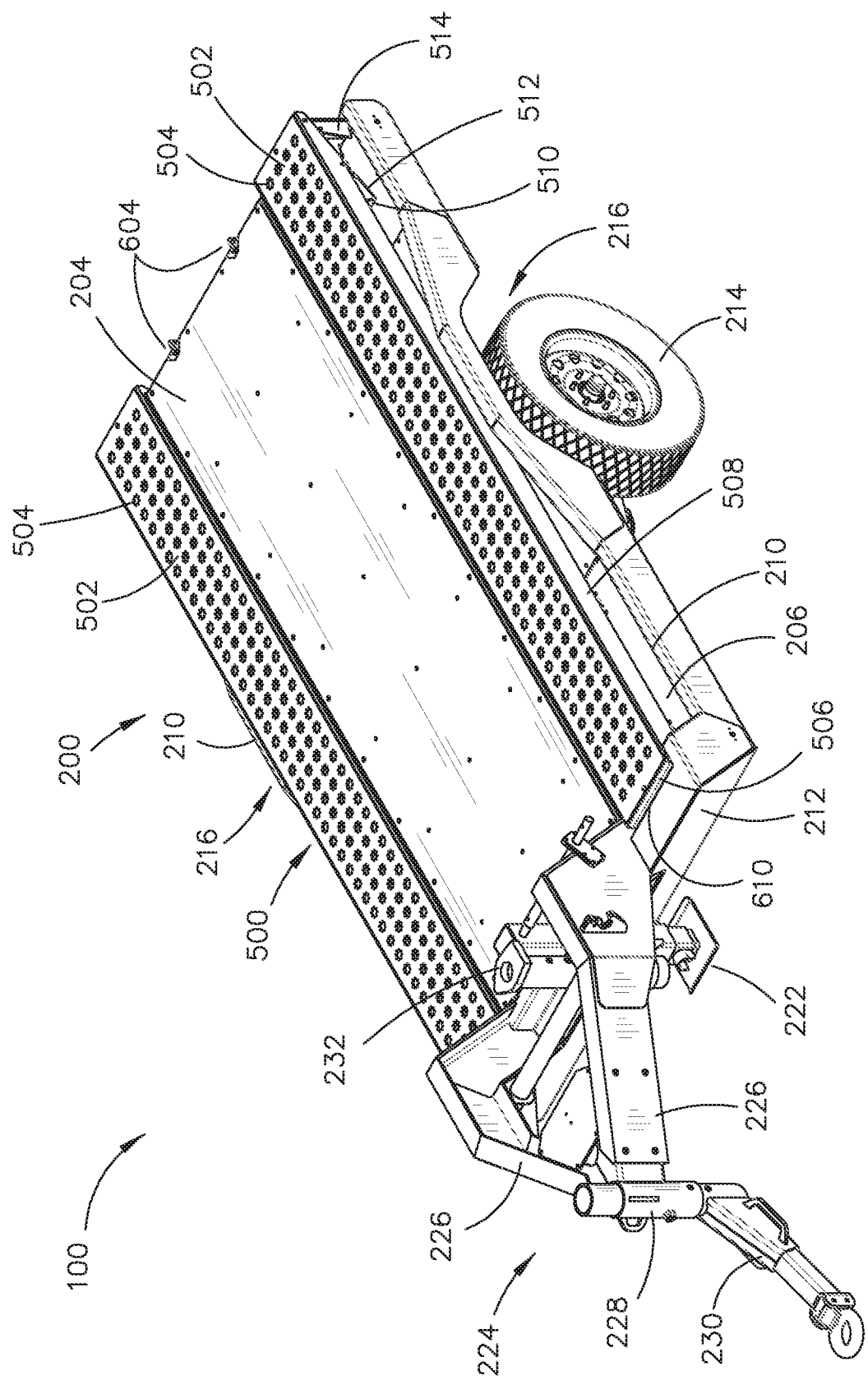
FIG. 6I illustrates a perspective view of a trailer configured for multiple hitches, in accordance with one or more embodiments of the present disclosure.
Figure 6J:
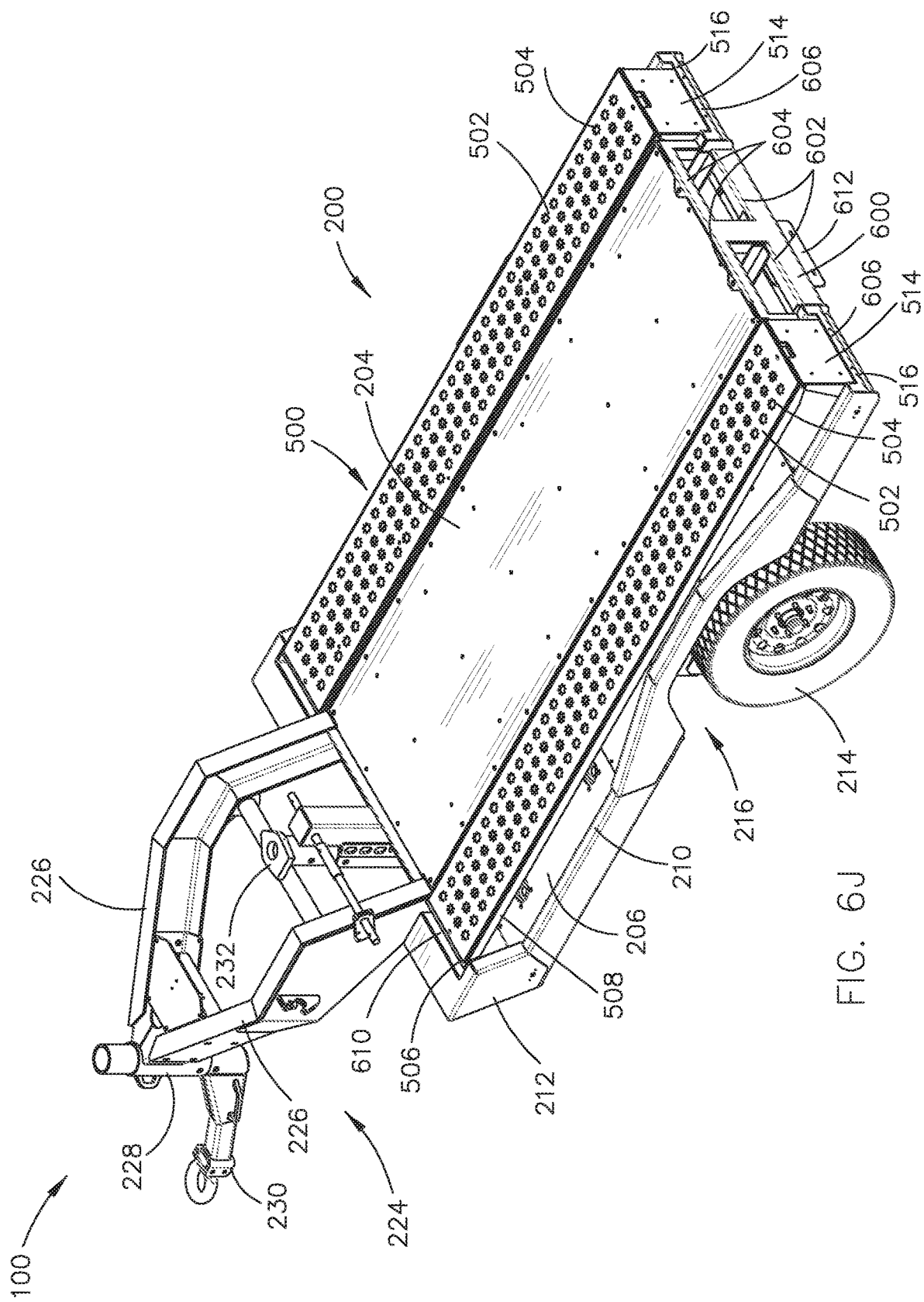
FIG. 6J illustrates a perspective view of a trailer configured for multiple hitches, in accordance with one or more embodiments of the present disclosure.
Figure 6K:
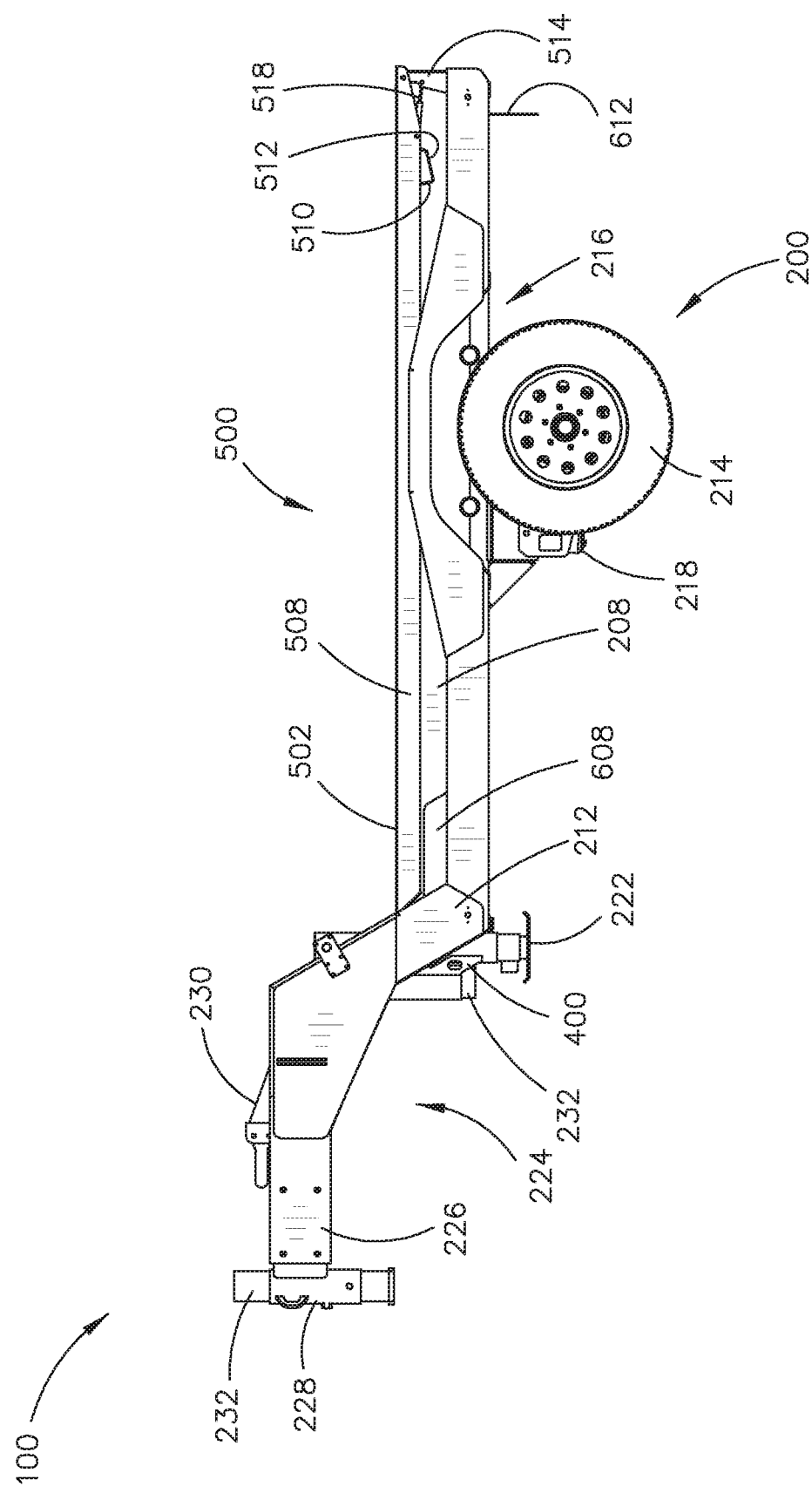
FIG. 6K illustrates a side view of a trailer configured for multiple hitches, in accordance with one or more embodiments of the present disclosure.

In another embodiment, the coupler bracket 400 is configured to receive and store the lunette ring coupler 230 and/or the gooseneck coupler 232 when not in use (e.g., not inserted within the hitch converter 228). For example, as illustrated in FIG. 4A, the lunette ring coupler 230 may be inserted into the hitch converter 228 and the gooseneck coupler 232 may be inserted into the coupler bracket 400 while the trailer 100 is hauled via a pintle hitch (e.g., the lunette ring 300 of the lunette ring coupler 230 is coupled to the pintle hook 104). By way of another example, as illustrated in FIGS. 4D and 4E, the gooseneck coupler 232 may be inserted into the hitch converter 228 and the gooseneck coupler 232 may be inserted into the coupler bracket 400 while the trailer 100 is hauled via a gooseneck hitch (e.g., the ball receiver 404 of the gooseneck coupler 232 is coupled to the gooseneck receiver hitch 108). By way of another example, as illustrated in FIGS. 4B and 4C, the lunette ring coupler 230 and the gooseneck coupler 232 may be swapped when switching between the pintle hitch and the gooseneck hitch.

Referring generally to FIGS. 5A-5E, a ramp 500 for the trailer 100 is illustrated, in accordance with one or more embodiments of the present disclosure.

In one embodiment, the ramp 500 includes a runway 502. In another embodiment, the runway 502 includes one or more components configured to increase traction and/or reduce weight of the ramp 500. For example, the runway 502 may include, but is not limited to, one or more holes 504. For instance, the one or more holes 504 may include, but are not limited to, one or more smooth-edge holes, one or more punched cut-outs with raised edges, or the like. In addition, the one or more holes 504 may include, but are not limited to, one or more circular holes, one or more star-shaped holes, or the like. It is noted herein the one or more holes 504 may include any shape known in the art. In addition, it is noted herein the runway 502 may include any traction-increasing component and/or weight-reducing cutout known in the art.

In another embodiment, the ramp 500 includes a front hook 506. For example, the front hook 506 may be configured to engage the one or more wheel blocks 212. By way of another example, the front hook 506 may extend a selected amount from a front edge of the runway 502. By way of another example, the front hook 506 may include a bend at a selected angle. For instance, the selected angle may include, but is not limited to, 90 degrees. In another embodiment, the ramp 500 includes one or more sidewalls 508. For example, the ramp 500 may include a sidewall 508 coupled to each long side of the runway 502. For instance, the sidewall 508 may be below the plane of the runway 502. Alternatively, a portion of the sidewall 508 may breach the plane of the runway 502 (e.g., forming a rail for the runway 502). It is noted herein the runway 502, the front hook 506, and/or the one or more sidewalls 508 may be fabricated from the same piece of metal via one or more fabrication processes (e.g., is stamped, bent, or the like). In the alternative, it is noted herein the runway 502, the front hook 506, and/or the one or more sidewalls 508 may be joined together (e.g., welded, or the like) via one or more fabrication processes.

In another embodiment, the ramp 500 includes one or more supports 510. For example, the one or more supports 510 may be coupled to the underside of the runway 500. By way of another example, the one or more supports 510 may be dimensioned to fit within the one or more sidewalls 508. In another embodiment, the one or more supports 510 may include an inclined/sloped surface 512. For example, the surface 512 may be inclined/sloped at a selected angle that allows the entire surface 512 to engage the ground when the ramp 500 is in a ramp position (e.g., load/unload state of operation).

In another embodiment, the ramp 500 includes a rotatable portion 514. In another embodiment, the rotatable portion 514 is positionable based on the use of the ramp 500 with respect to the trailer 100. For example, as illustrated in FIGS. 5B and 5D, the rotatable portion 514 may be in the storage position or the ramp position (e.g., the load/unload position). By way of another example, as illustrated in FIGS. 5C and 5E, the rotatable portion 514 may be in a platform position.

In another embodiment, the rotatable portion 514 includes a rear surface 516. In another embodiment, the rotatable portion 514 includes a bumper 518 along one edge. For example, the bumper 518 may be fabricated from a material including, but not limited to, rubber, plastic, silicone, or the like. In another embodiment, the ramp 500 includes a piston 520 coupled to the rotatable portion 514. For example, the piston 520 may provide a tension force to the rotatable portion 514 that keeps the rotatable portion 514 within the storage position or the ramp position (e.g., the load/unload position), unless the ramp 500 is in the platform position.

Referring generally to FIGS. 6A-6K, the trailer 100 and one or more ramps 500 are illustrated, in accordance with one or more embodiments of the present disclosure.

In one embodiment, the trailer 100 includes a rear plate 600. For example, the rear plate 600 may be coupled to the platform 204, the one or more runners 206, and/or the one or more sidewalls 208. In another embodiment, the trailer 100 includes a recess defined by one or more of the trailer frame 202, the platform 204, the one or more sidewalls 208, the one or more wheel blocks 212, and/or the rear plate 600. For example, the recess may be located underneath the platform 204 and within the one or more sidewalls 208. In another embodiment, the recess includes one or more tracks 602 accessible via one or more holes in the rear plate 600. For example, the one or more tracks 602 may be integrated with, partially integrated with, or separate from the trailer frame 202. In another embodiment, the one or more ramps 500 are configured to fit within the one or more tracks 602.

In another embodiment, the platform 204 includes one or more lock holes 604 that align with one or more lock holes in the one or more ramps 500 when the one or more ramps 500 are inserted in the one or more tracks 602. In another embodiment, the one or more lock holes 604 are configured to receive a locking component that prevents the one or more ramps 500 from dismounting from the one or more tracks 602 during operation. It is noted herein the locking component may include any locking component known in the art including, but not limited to, a locking component as previously listed herein.

In another embodiment, the one or more runners 206 include one or more ramp mount points 606. In another embodiment, the one or more ramps 500 are configured to engage the one or more ramp mount points 606. For example, the front hook 506 of the ramp 500 may be inserted into the ramp mount point 606 when the ramp 500 is in the ramp position (e.g., the load/unload position). For instance, the inclined/sloped surface 512 of the one or more supports 510 and/or the rear surface 516 of the rotatable portion 514 may be in full contact with the ground when the ramp 500 is in the ramp position (e.g., the load/unload position). By way of another example, the bumper 518 of the rotatable portion 514 may be inserted into the ramp mount point 606 when the ramp 500 is in the platform position.

In another embodiment, the trailer 100 includes one or more guide plates 608. For example, the one or more guide plates 608 may be parallel or substantially parallel to the one or more sidewalls 208. By way of another example, the one or more guide plates 608 may be configured to conform or map to one or more sections of the one or more ramps 500. For instance, the trailer 100 may include a guide plate 608 on a portion of a sidewall 208 near the one or more wheel blocks 212, where the guide plate 608 is configured to conform or map to a front section of a sidewall 508 near a front hook 506 of a ramp 500 when the ramp 500 is in the platform position.

In another embodiment, the trailer 100 includes one or more ramp mount points 610 coupled to the one or more wheel blocks 212. In another embodiment, the one or more ramps 500 are configured to engage the one or more ramp mount points 610. For example, a front hook 506 of the ramp 500 may be inserted into a ramp mount point 610 when the ramp 500 is in the platform position.

In another embodiment, where a ramp 500 is in the platform position above the runner 206, the one or more sidewalls 508 of the ramp 500 are configured to fit between a sidewall 208 and a rail 210 in a space having a width defined by the runner 206. In another embodiment, where the ramp 500 is in the platform position above the runner 206, the rear surface 516 of the rotatable portion 514 may be flush or substantially flush with a rear surface of the runner 206.

In another embodiment, the hauling surface of the trailer 100 includes the platform 204. In another embodiment, where a ramp 500 is in the platform position above a runner 206, one or more dimensions (e.g., width) of the platform 204 may be extended to include the portion of the trailer 100 including the one or more runners 206, such that the area of the hauling surface of the trailer 100 may be increased when not utilizing the trailer 100 to haul the vehicle 106. It is noted herein the height of the plane of the runway 502 may be the same or substantially similar to the plane of the platform 204 relative to the ground when the ramp 500 is in the platform position above the runner 206, such that the hauling surface of the trailer 100 may remain planar or substantially planar.

In another embodiment, the trailer 100 includes a plate bracket 612. For example, the plate bracket 612 may be configured for a component (e.g., pintle hook, receiver hitch, or the like) for a towing system. By way of another example, the plate bracket 612 may be configured as a license plate mount.

In one embodiment, the vehicle 106 is hauled to a site on the trailer 100 via the vehicle 102, where the trailer 100 is coupled to the vehicle 102 via a first hitch. For example, the first towing system may include, but is not limited to, a pintle hitch including the pintle hook 104 coupled to the vehicle 102 and the lunette ring 300 coupled to the trailer 100 via the lunette ring coupler 230 inserted into the hitch converter 228.

Upon arrival at the site, the vehicle 106 is unloaded from the trailer 100. For example, the one or more ramps 500 may be removed from the one or more tracks 602 of the trailer 100 and inserted into the one or more ramp mount points 606 of the one or more runners 206. By way of another example, the trailer 100 may be coupled to the vehicle 102 during the unloading of the vehicle 106 via the one or more ramps 500. By way of another example, the jack 222 of the trailer 100 may be utilized during the unloading of the vehicle 106.

Following unloading, the lunette ring coupler 230 is removed from the hitch converter 228 and swapped for the gooseneck coupler 232 (e.g., which is stored in the coupler bracket 400). The gooseneck coupler 232 is then coupled to the gooseneck receiver hitch 108 of the vehicle 106. Each ramp 500 is reconfigured to engage the trailer 100 in the platform position, with the front hook 506 engaging the one or more ramp mount points 610 of the one or more wheel blocks 212 and/or the rotatable portion 514 (e.g., bumper 518) engaging the one or more ramp mount points 606 of the one or more runners 206. In the alternative, the one or more ramps 500 are instead inserted back into the one or more tracks 602.

In one embodiment, one or more components of the trailer 100 is fabricated from a metal. For example, one or more components of the trailer 100 may be fabricated from steel. For instance, a rim of the two or more wheels 214, the one or more suspension components 218, the one or more brake assembly components 220, the trailer jack 222, the lunette ring coupler 230, and/or the gooseneck coupler 232 may be fabricated from steel. By way of another example, one or more components of the trailer 100 may be fabricated from aluminum. For instance, one or more components of the trailer bed 200 (e.g., the trailer frame 202, the platform 204, the one or more runners 206, the one or more sidewalls 208, the one or more rails 210, the one or more wheel blocks 212, the one or more wheel wells 216, the rear plate 600, the plate bracket 612, or the like) or the one or more ramps 500 may be fabricated from aluminum. In addition, one or more components of the draw bar assembly 224 (e.g., the draw bar members 226, the hitch converter 228, or the like) may be fabricated from aluminum. It is noted herein one or more components of the trailer 100 may be fabricated from any metal known in the art.

It is noted herein the trailer 100 may include one or more electrical accessories. For example, the trailer 100 may include, but is not limited to, one or more lights. For instance, the one or more lights may include, but are not limited to, one or more brake lights coupled to the brake assembly 220. In addition, the one or more lights may include, but are not limited to, one or more headlights, one or more side lights, one or more running lights, one or more utility lights, one or more spot lights, one or more work lights, or the like. Further, the trailer 100 may include, but is not limited to, one or more electrical couplers for the one or more lights (e.g., the trailer connector). By way of another example, the trailer 100 may include, but is not limited to, one or more power couplers such as 120-volt alternating current (AC) outlets, 12-volt direct current (DC) ports, or the like. By way of another example, the trailer 100 may include, but is not limited to, one or more computer connectors such as one or more universal serial bus (USB) ports, or the like.

Advantages of the present disclosure include a trailer configured for multiple hitches. Advantages of the present disclosure also include hauling a second vehicle capable of towing the trailer via a first vehicle coupled to the trailer. Advantages of the present disclosure also include couplers for converting the trailer to accept multiple hitches. Advantages of the present disclosure also include a set of ramps configured to stow within a recess on the trailer and couple to a surface of the trailer.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A trailer, comprising:
 a trailer bed, comprising:
  a platform coupled to a trailer frame;
  a set of runners coupled to the platform, wherein the set of runners are configured to receive one or more wheels of a first vehicle;
  a set of wheel blocks configured to prevent the first vehicle from dismounting from the trailer bed; and
  one or more sets of two or more wheels;
 a draw bar assembly coupled to the trailer bed, wherein the draw bar assembly comprises one or more draw bar arms; and
 a convertible hitch assembly, wherein the convertible hitch assembly comprises:
  a hitch converter coupled to the one or more draw bar arms;
  an over-axle hitch coupler including a first converter stem insertable into and removable from the hitch converter, wherein the over-axle hitch coupler is couplable to the first vehicle when the first vehicle is unloaded from the trailer bed and the first converter stem is inserted into the hitch converter; and a behind-axle hitch coupler including a second converter stem insertable into and removable from the hitch converter, wherein the behind-axle hitch coupler is couplable to an additional vehicle when the second converter stem is inserted into the hitch converter; and wherein the draw bar assembly further comprises a coupler bracket, wherein the first converter stem of the over-axle hitch coupler mates with and is removeable from the coupler bracket, wherein the second converter stem of the behind-axle hitch coupler mates with and is removeable from the coupler bracket.

2. The trailer in claim 1, wherein the over-axle hitch coupler is inserted in the coupler bracket when the behind-axle hitch coupler is inserted in the hitch converter, wherein the behind-axle hitch coupler is inserted in the coupler bracket when the over-axle hitch coupler is inserted in the hitch converter.

3. The trailer in claim 1, further comprising:
a set of ramps, wherein the set of ramps are storable in one or more tracks in a recess defined by the trailer frame, wherein the set of ramps are couplable in a plurality of positions to one or more ramp mount points on the trailer bed.

4. The trailer in claim 3, wherein the set of ramps comprise:
a runway;
one or more sidewalls coupled to one or more side edges of the runway;
a front hook coupled to a front edge of the runway; and
a rotatable portion coupled to a rear edge of the runway.

5. The trailer in claim 4, wherein the plurality of positions includes a ramp position, wherein the front hook engages a ramp mount point on the set of runners when the set of ramps are in the ramp position.

6. The trailer in claim 5, wherein the set of ramps further comprise:
one or more supports including a sloped surface, wherein at least one of the sloped surface of the one or more supports or a rear surface of the rotatable portion engages the ground when the set of ramps are in the ramp position.

7. The trailer in claim 4, wherein the plurality of positions includes a platform position, wherein the rotatable portion engages a ramp mount point on the set of runners and the front hook engages a ramp mount point on the set of wheel blocks when the set of ramps are in the ramp position.

8. The trailer in claim 7, wherein the set of ramps further comprise:
a bumper coupled to the rotatable portion, wherein the bumper is positioned between the rotatable portion and the ramp mount point on the set of runners when the set of ramps are in the platform position.

9. The trailer in claim 7, wherein a horizontal plane of the runway and a horizontal plane of the platform are a substantially similar height relative to the ground when the set of ramps are positioned in the platform position.

10. The trailer in claim 4, wherein the set of ramps further comprise:
a piston coupled to the rotatable portion, wherein the piston is configured to prevent the rotatable portion from rotating when the set of ramps are stored within the one or more tracks in the recess defined by the trailer frame.

11. The trailer in claim 4, wherein the platform includes one or more platform lock holes, wherein the one or more platform holes are aligned with one or more ramp lock holes on the set of ramps when the set of ramps are stored in the one or more tracks in the recess defined by the trailer frame, wherein the one or more platform lock holes and the one or more ramp lock holes are configured to receive one or more locking components, wherein the one or more locking components are configured to prevent the set of ramps from dismounting from the one or more tracks.

12. The trailer in claim 4, wherein the runway includes one or more components configured to at least one of increase traction or reduce weight of the set of ramps.

13. The trailer in claim 1, wherein a horizontal plane of the set of runners is lower relative to the ground than a horizontal plane of the platform, wherein the set of runners are coupled to the side of the platform via a sidewall, wherein the sidewall is configured to prevent the first vehicle from dismounting from the trailer bed.

14. The trailer in claim 1, wherein the set of runners includes one or more rails configured to prevent the first vehicle from dismounting from the trailer bed.

15. The trailer in claim 1, wherein the trailer bed further comprises:
two wheel wells, wherein the set of runners includes one or more raised sections corresponding to the two wheel wells.

16. The trailer in claim 1, wherein the one or more sets of two or more wheels are coupled to the trailer frame via one or more independent suspension components, wherein a first wheel of the one or more sets of two or more wheels is configured for independent suspension travel relative to an additional wheel of the one or more sets of two or more wheels.

17. A method comprising:
transporting a first vehicle on a trailer coupled to an additional vehicle, wherein the trailer is convertible from a behind-axle hitch to an over-axle hitch;
unloading the first vehicle from the trailer;
uncoupling the additional vehicle from a behind-axle hitch coupler inserted in a hitch converter of the trailer;
removing the behind-axle hitch coupler from the hitch converter;
inserting an over-axle hitch coupler into the hitch converter;
coupling the first vehicle to the trailer via the over-axle hitch coupler; and
utilizing a set of ramps in at least one of a ramp position or a platform position,
wherein the utilizing the set of ramps in the ramp position includes:
removing a set of ramps from one or more tracks in a recess defined by a trailer frame of the trailer; and
engaging a ramp mount point on a set of runners with a front hook of the set of ramps,
wherein the utilizing the set of ramps in the platform position includes:
engaging the ramp mount point on the set of runners with a rotatable portion of the set of ramps; and
engaging a ramp mount point on a set of wheel blocks of the trailer with the front hook of the set of ramps.

18. A trailer, comprising:
a trailer bed including a platform and one or more sets of two or more wheels;
a draw bar assembly coupled to the trailer bed; and
a convertible hitch assembly, wherein the convertible hitch assembly comprises:
a hitch converter coupled to the draw bar assembly;
an over-axle hitch coupler including a first converter stem insertable into and removable from the hitch converter, wherein the over-axle hitch coupler is configured to be mated to an over-axle hitch component coupled to a first vehicle when the first converter stem is inserted into the hitch converter; and a behind-axle hitch coupler including a second converter stem insertable into and removable from the hitch converter, wherein the behind-axle hitch coupler is configured to be mated to a behind-axle hitch component coupled to an additional vehicle when the second converter stem is inserted into the hitch converter;

wherein the first converter stem is insertable into the hitch converter when the second converter stem is removed from the hitch converter, wherein the second converter stem is insertable into the hitch converter when the first converter stem is removed from the hitch converter; and wherein the draw bar assembly further comprises a coupler bracket, wherein the first converter stem of the over-axle hitch coupler mates with and is removeable from the coupler bracket, wherein the second converter stem of the behind-axle hitch coupler mates with and is removeable from the coupler bracket.

\* \* \* \* \*